(12) United States Patent
Shibayama et al.

(10) Patent No.: US 11,072,395 B2
(45) Date of Patent: Jul. 27, 2021

(54) WATERCRAFT AND GUIDE

(71) Applicant: YAMAHA HATSUDOKI KABUSHIKI KAISHA, Iwata (JP)

(72) Inventors: Susumu Shibayama, Shizuoka (JP); Nobuharu Ota, Shizuoka (JP); Takahiro Fujimoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 334 days.

(21) Appl. No.: 16/035,735

(22) Filed: Jul. 16, 2018

(65) Prior Publication Data
US 2019/0217921 A1 Jul. 18, 2019

(30) Foreign Application Priority Data

Jan. 17, 2018 (JP) .............................. JP2018-005782
May 11, 2018 (JP) .............................. JP2018-092018

(51) Int. Cl.
| | |
|---|---|
| *B63B 1/32* | (2006.01) |
| *B63B 1/18* | (2006.01) |
| *B63H 11/08* | (2006.01) |
| *B63H 11/107* | (2006.01) |
| *B63H 11/00* | (2006.01) |
| *B63B 32/40* | (2020.01) |
| *B63B 34/70* | (2020.01) |

(52) U.S. Cl.
CPC .................. *B63B 1/32* (2013.01); *B63B 1/18* (2013.01); *B63H 11/08* (2013.01); *B63H 11/107* (2013.01); *B63B 32/40* (2020.02); *B63B 34/70* (2020.02); *B63H 2011/008* (2013.01)

(58) Field of Classification Search
CPC .................................. B63B 1/32; B63B 1/18
See application file for complete search history.

(56) References Cited

U.S. PATENT DOCUMENTS

| | | | |
|---|---|---|---|
| 6,427,616 B1 * | 8/2002 | Hagen ...................... | B63B 1/32 114/125 |
| 9,611,006 B1 * | 4/2017 | Miller .................... | B63B 39/061 |
| 9,834,280 B1 * | 12/2017 | Wilmoth, III .......... | B63B 32/70 |
| 2001/0027069 A1 | 10/2001 | Mashiko et al. | |
| 2008/0264325 A1 * | 10/2008 | Tevlin ..................... | B63B 15/00 114/364 |
| 2009/0178604 A1 * | 7/2009 | McKeand ............... | B63B 15/00 114/343 |
| 2011/0092113 A1 * | 4/2011 | Mataya ................... | B63H 11/11 440/38 |

(Continued)

*Primary Examiner* — S. Joseph Morano
*Assistant Examiner* — Jovon E Hayes
(74) *Attorney, Agent, or Firm* — Keating and Bennett, LLP

(57) ABSTRACT

A watercraft includes a vessel body, a marine propulsion device and a guide. The marine propulsion device is attached to the vessel body and includes a water stream generator that propels the vessel body. The guide is provided on the vessel body and extends astern of the vessel body and toward a center of the vessel body in a width direction of the vessel body from a position located sideward of the water stream generator. The guide inwardly directs water flowing on one lateral side of the vessel body such that confluent timing of the water flowing on the one lateral side of the vessel body and water flowing on the other lateral side of the vessel body is caused to occur earlier than when the guide is not provided on the vessel body.

23 Claims, 31 Drawing Sheets

(56) References Cited

U.S. PATENT DOCUMENTS

| | | | | |
|---|---|---|---|---|
| 2011/0320072 A1* | 12/2011 | Morvillo | ............... | B63H 25/44 |
| | | | | 701/21 |
| 2014/0026799 A1* | 1/2014 | Kalil | ........................ | B63B 1/20 |
| | | | | 114/285 |
| 2016/0009342 A1* | 1/2016 | Thomas | .................. | B63B 34/60 |
| | | | | 114/271 |
| 2017/0038771 A1* | 2/2017 | Green | ..................... | G06F 3/165 |
| 2017/0349247 A1* | 12/2017 | Herrington | ............ | B63H 25/38 |
| 2019/0217921 A1* | 7/2019 | Shibayama | ............... | B63B 1/32 |

\* cited by examiner

WATERCRAFT AND GUIDE

CROSS REFERENCE TO RELATED APPLICATIONS

This application claims the benefit of priority to Japanese Patent Application No. 2018-005782 filed on Jan. 17, 2018 and Japanese Patent Application No. 2018-092018 filed on May 11, 2018. The entire contents of these applications are hereby incorporated herein by reference.

BACKGROUND OF THE INVENTION

1. Field of the Invention

The present invention relates to a watercraft and a guide.

2. Description of the Related Art

A type of watercraft used for wakesurfing has been recently disclosed in, for instance, U.S. Patent Application Publication No. US2014/0026799A1. In wakesurfing, a surfer follows behind a watercraft, while riding on a wake generated by the watercraft using a wakesurf board.

SUMMARY OF THE INVENTION

In wakesurfing, a surfer prefers a less splashy, flat wake. However, a watercraft is equipped with a marine propulsion device for propelling the watercraft, and a wake is likely to be turbulent due to a water stream generated by the marine propulsion device. For example, a jet propulsion device or an outboard motor is a type of marine propulsion device. The jet propulsion device spouts water through a jet spout so as to generate a water stream for propelling the watercraft. The outboard motor rotates a propeller so as to generate a water stream for propelling the watercraft. Due to such a water stream, water splashes on the surface of water behind the watercraft. Hence, it is not easy to reliably generate a less splashy, flat wake behind the watercraft. In view of this, it has been demanded to produce a watercraft that can generate a less splashy, flat wake by suppressing the impact of the water stream generated by the marine propulsion device.

A watercraft according to a preferred embodiment of the present invention includes a vessel body, a marine propulsion device and a guide. The marine propulsion device is attached to the vessel body and includes a water stream generator that propels the vessel body. The guide is provided on the vessel body. The guide extends astern of the vessel body and toward a center of the vessel body in a width direction of the vessel body from a position located sideward of the water stream generator. The guide inwardly directs water flowing on one lateral side of the vessel body such that confluent timing of the water flowing on the one lateral side of the vessel body and water flowing on the other lateral side of the vessel body is caused to occur earlier than when the guide is not provided on the vessel body.

A watercraft according to another preferred embodiment of the present invention includes a vessel body, a marine propulsion device, a left guide and a right guide. The marine propulsion device is attached to the vessel body and includes a water stream generator that propels the vessel body. The left guide is disposed leftward of the water stream generator. The right guide is disposed rightward of the water stream generator. The left guide extends astern of the vessel body and toward a center of the vessel body in a width direction of the vessel body from a position located leftward of the water stream generator. The right guide extends astern of the vessel body and toward the center of the vessel body in the width direction of the vessel body from a position located rightward of the water stream generator. The left guide inwardly directs water flowing on a left lateral side of the vessel body such that confluent timing of the water flowing on the left lateral side of the vessel body and water flowing on a right lateral side of the vessel body is caused to occur earlier when the left guide is used than when the left guide is not used. The right guide inwardly directs the water flowing on the right lateral side of the vessel body such that the confluent timing of the water flowing on the right lateral side of the vessel body and the water flowing on the left lateral side of the vessel body is caused to occur earlier when the right guide is used than when the right guide is not used.

A guide according to another preferred embodiment of the present invention is attached to a vessel body including a water stream generator that propels the vessel body, and includes an connector, a first guide surface and a second guide surface. The connector is detachably connected or attached to the vessel body. The first guide surface extends astern of the vessel body and toward a center of the vessel body in a width direction of the vessel body from a position located sideward of the water stream generator in a condition that the guide is attached to the vessel body. The second guide surface is disposed outside the first guide surface. The first guide surface directs water flowing on one lateral side of the vessel body to a position located behind and above the water stream generator in the condition that the guide is attached to the vessel body. The second guide surface inwardly directs the water flowing on the one lateral side of the vessel body such that confluent timing of the water flowing on the one lateral side of the vessel body and water flowing on the other lateral side of the vessel body is caused to occur earlier when the guide is attached to the vessel body than when the guide is not attached to the vessel body.

A watercraft according to another preferred embodiment of the present invention includes a vessel body, a marine propulsion device and a guide. The marine propulsion device is attached to the vessel body and includes a water stream generator that propels the vessel body. The guide is provided on the vessel body. The guide inwardly directs water flowing on one lateral side of the vessel body such that confluent timing of the water flowing on the one lateral side of the vessel body and water flowing on the other lateral side of the vessel body is caused to occur earlier than when the guide is not provided on the vessel body. At least a portion of the guide is disposed above the water stream generator.

A watercraft according to another preferred embodiment of the present invention includes a vessel body, a marine propulsion device and a guide. The marine propulsion device is attached to the vessel body and includes a water stream generator that propels the vessel body. The guide is provided on the vessel body. The guide directs water flowing along a lateral surface of the vessel body toward a water stream generated by the water stream generator so as to eliminate a splash generated by the water stream and generate a wake for wakesurfing.

A watercraft according to another preferred embodiment of the present invention includes a vessel body, a marine propulsion device and a guide. The marine propulsion device is attached to the vessel body and includes a water stream generator that propels the vessel body. The guide is provided on the vessel body. The guide inwardly directs water flowing along a lateral surface of the vessel body so as to generate a wake for wakesurfing on the same side as the guide disposed on one side from a center of the vessel body in a width direction of the vessel body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
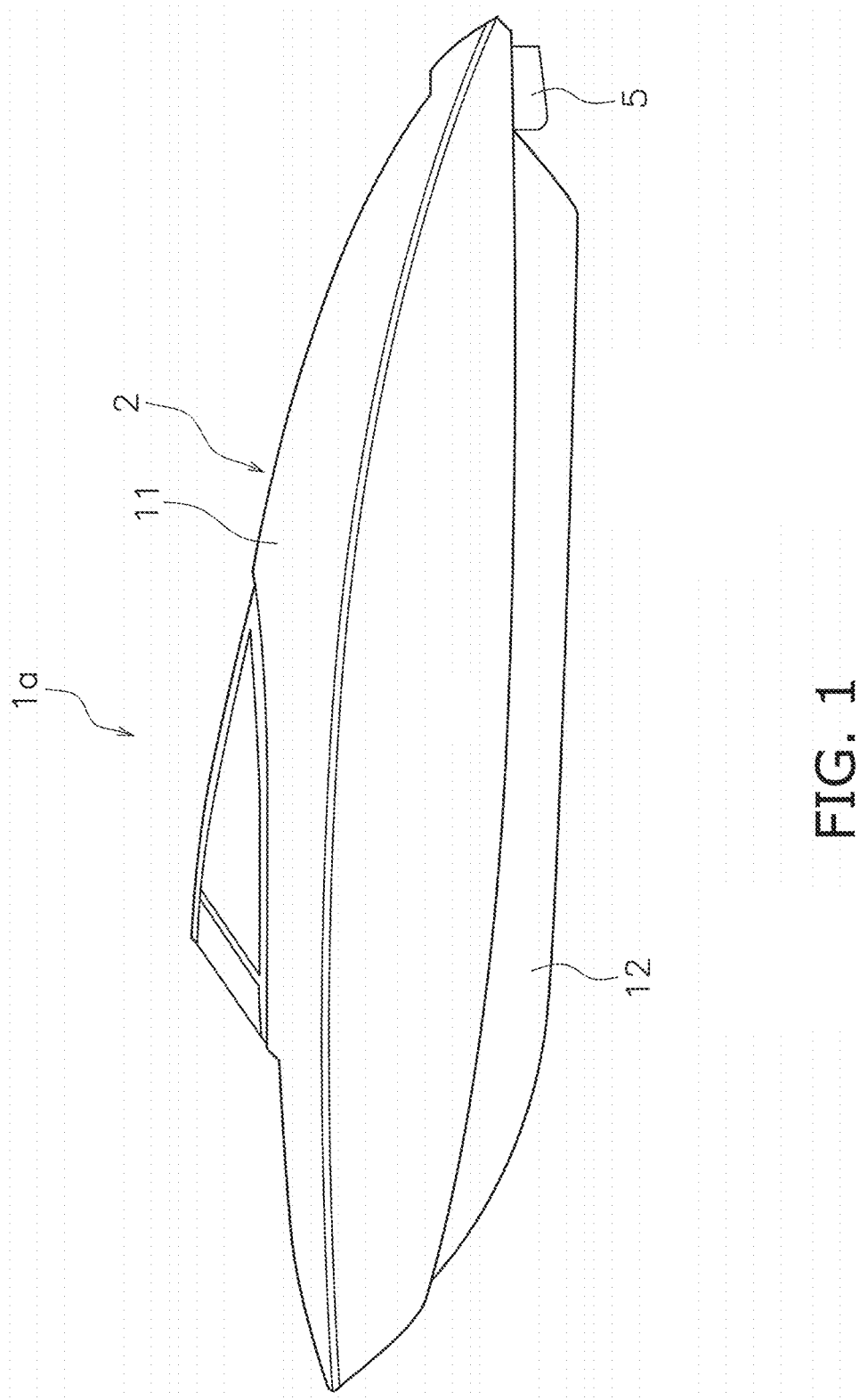
FIG. 1 is a side view of a watercraft according to a first preferred embodiment of the present invention.
Figure 2:
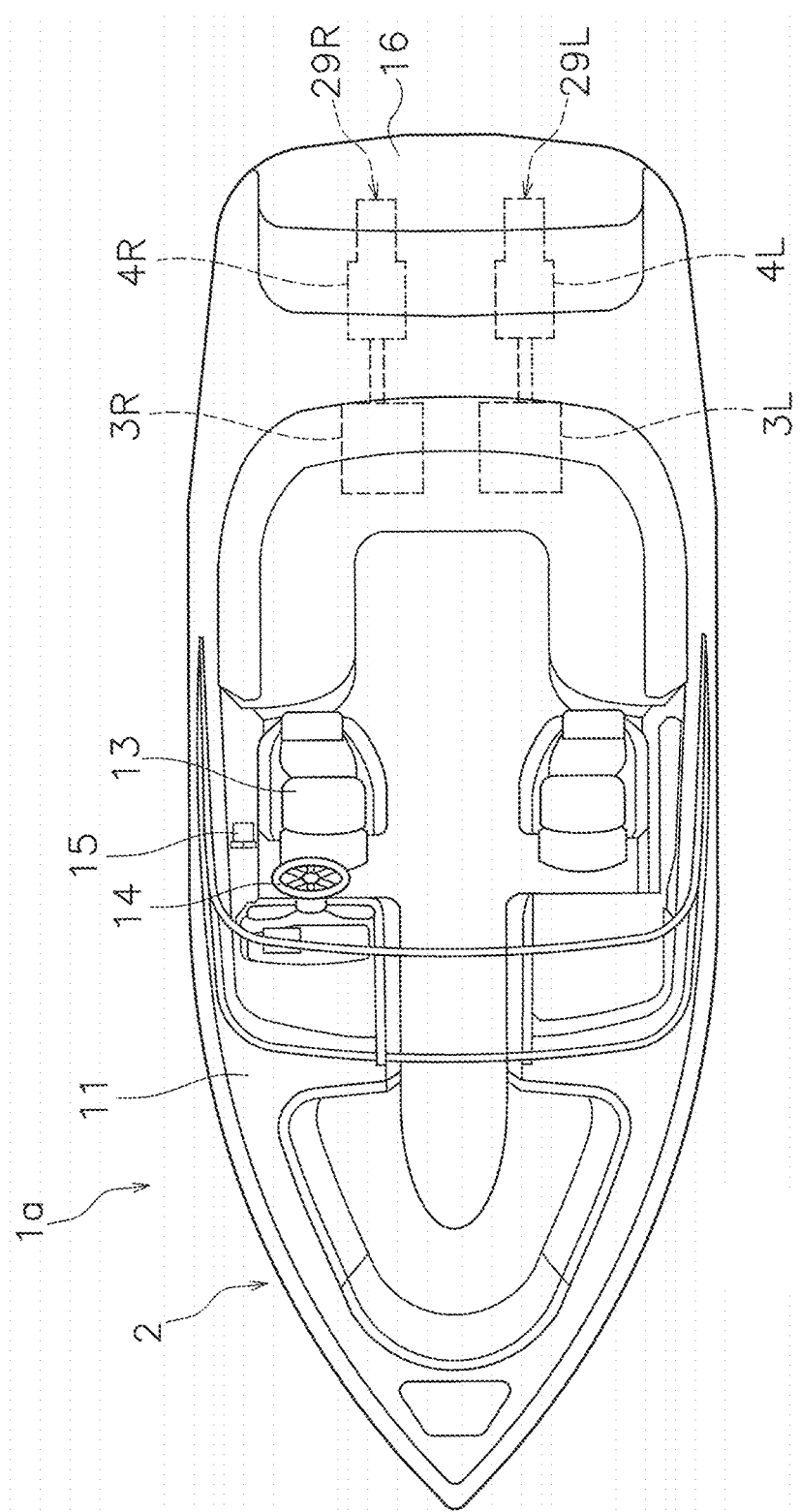
FIG. 2 is a top view of the watercraft according to the first preferred embodiment of the present invention.
Figure 3:
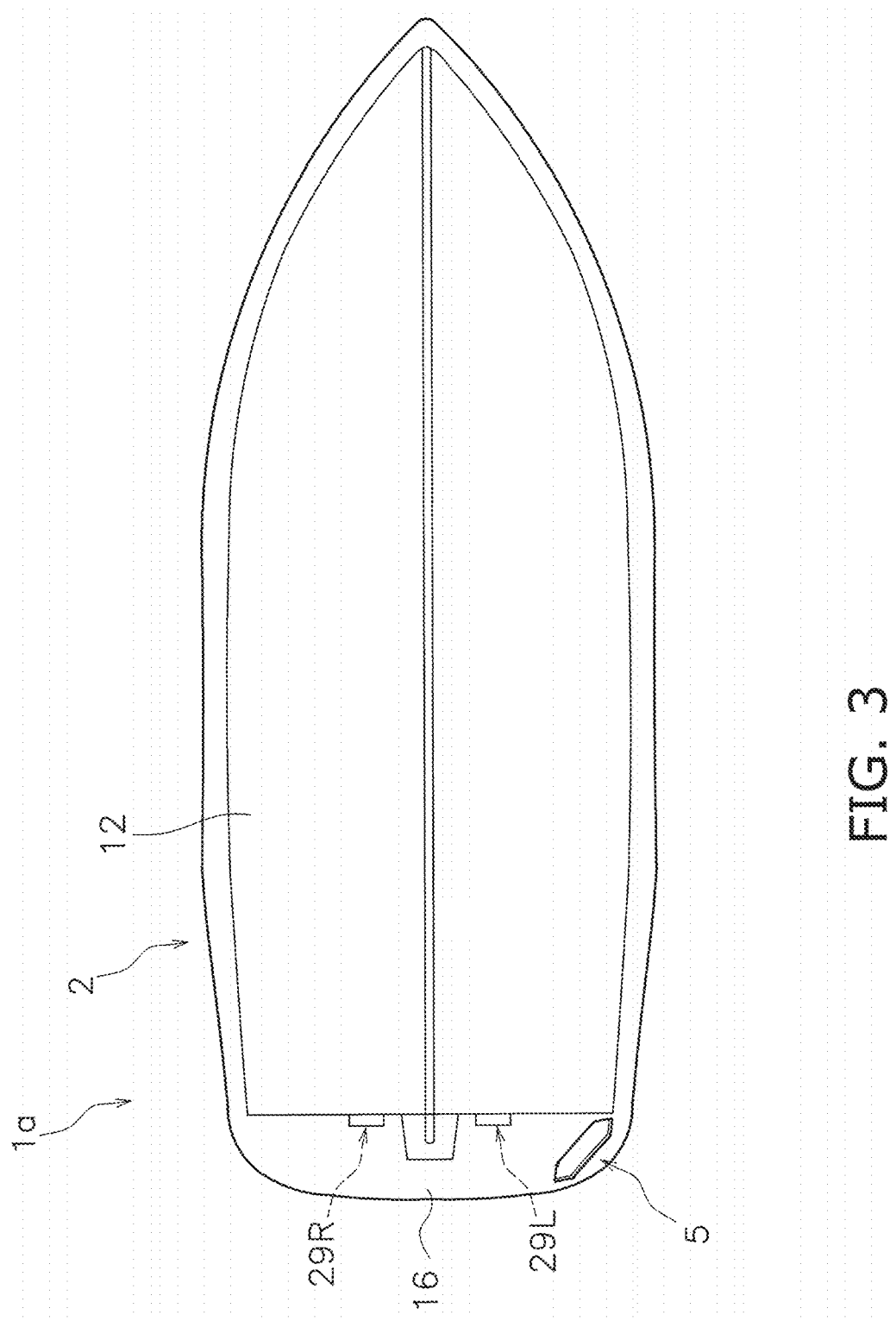
FIG. 3 is a bottom view of the watercraft according to the first preferred embodiment of the present invention.

Watercrafts according to preferred embodiments will be hereinafter explained with reference to the attached drawings. FIG. 1 is a side view of a watercraft 1*a* according to a first preferred embodiment of the present invention. FIG. 2 is a top view of the watercraft 1*a*. FIG. 3 is a bottom view of the watercraft 1*a*. In the present preferred embodiment, the watercraft 1*a* is, for example, a jet propulsion watercraft, which is a type of watercraft called a jetboat or a sport boat.

The watercraft 1*a* includes a vessel body 2, engines 3L and 3R, and marine propulsion devices 4L and 4R. The vessel body 2 includes a deck 11 and a hull 12. The hull 12 is disposed below the deck 11. An operator seat 13 is disposed on the deck 11. The operator seat 13 is provided with a steering wheel 14 to steer the watercraft 1*a*. Additionally, the operator seat 13 is provided with an operating lever 15 to switch between forward and backward movements of the watercraft 1*a* and regulate the vessel velocity of the watercraft 1*a*. A transom step 16 is disposed at the rear of the deck 11.

The watercraft 1*a* includes the two engines 3L and 3R and the two marine propulsion devices 4L and 4R, for example. The watercraft 1*a* includes a first engine 3L and a second engine 3R. The watercraft 1*a* includes a first marine propulsion device 4L and a second marine propulsion device 4R. It should be noted that the number of engines is not limited to two, and alternatively, may be one or may be three or greater. The number of marine propulsion devices is not limited to two, and alternatively, may be one or may be three or greater.

The first and second engines 3L and 3R are accommodated in the vessel body 2. The output shaft of the first engine 3L is connected to the first marine propulsion device 4L. The output shaft of the second engine 3R is connected to the second marine propulsion device 4R. The first marine propulsion device 4L is driven by the first engine 3L, and generates a thrust to move the vessel body 2. The second marine propulsion device 4R is driven by the second engine 3R, and generates a thrust to move the vessel body 2. The first and second marine propulsion devices 4L and 4R are disposed right and left in alignment with each other.

The first and second marine propulsion devices 4L and 4R are jet propulsion devices that suck and spout water in the surroundings of the vessel body 2. The first marine propulsion device 4L includes a first jet spout 29L. The second marine propulsion device 4R includes a second jet spout 29R. The first marine propulsion device 4L spouts water through the first jet spout 29L. The second marine propulsion device 4R spouts water through the second jet spout 29R. Accordingly, the first and second marine propulsion devices 4L and 4R propel the vessel body 2. In other words, the first and second jet spouts 29L and 29R are water stream generators that propel the vessel body 2.

Figure 4:
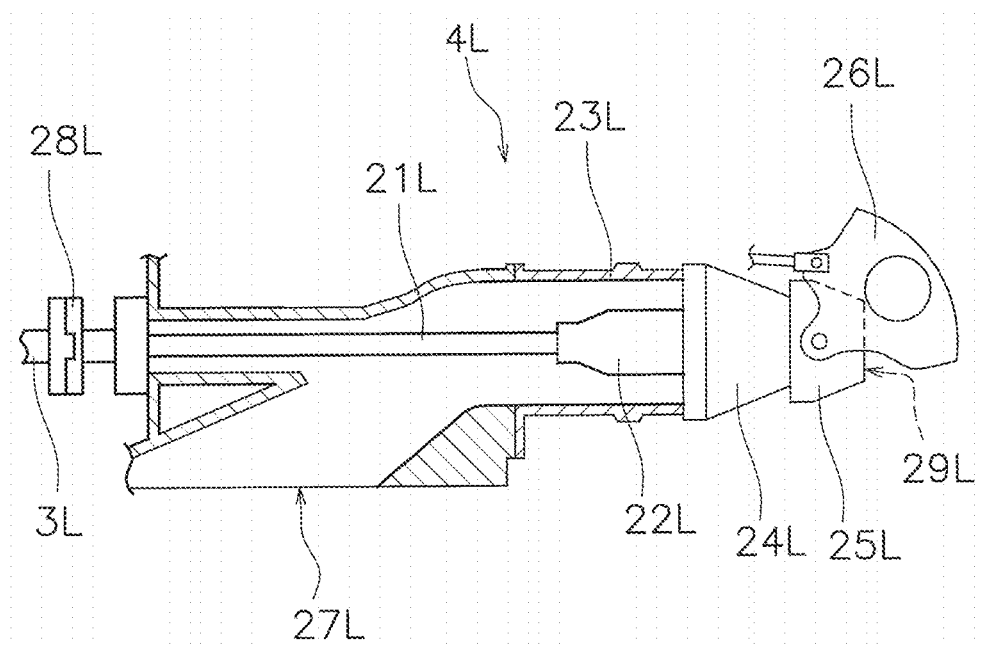
FIG. 4 is a cross-sectional side view of a configuration of a marine propulsion device according to the first preferred embodiment of the present invention.

FIG. 4 is a side view of a configuration of the first marine propulsion device 4L. It should be noted that FIG. 4 shows a portion of the first marine propulsion device 4L in a cross-sectional representation. As shown in FIG. 4, the first marine propulsion device 4L includes a first impeller shaft 21L, a first impeller 22L, a first impeller housing 23L, a first nozzle 24L, a first deflector 25L and a first reverse bucket 26L.

The first impeller shaft 21L extends in a back-and-forth direction. The front portion of the first impeller shaft 21L is connected to the output shaft of the first engine 3L through a coupling 28L. The first impeller 22L is attached to the rear portion of the first impeller shaft 21L. The first impeller 22L is disposed inside the first impeller housing 23L. The first impeller 22L is rotated together with the first impeller shaft 21L in order to draw water through a water suction port 27L. The first impeller 22L spouts the drawn water backward through the first nozzle 24L.

The first deflector 25L is disposed behind the first nozzle 24L. The first reverse bucket 26L is disposed behind the first deflector 25L. The first deflector 25L changes the direction of water spouted through the first nozzle 24L to a right-and-left direction. The first jet spout 29L is provided in the first deflector 25L. It should be noted that the first jet spout 29L may be provided in another portion such as the first nozzle 24L.

The first reverse bucket 26L is switchable between a forward moving position and a backward moving position. When the position of the first reverse bucket 26L is switched between the forward moving position and the backward moving position, the direction of water spouted through the first nozzle 24L is changed. As a result, movement of the watercraft 1a is switched between forward movement and backward movement. Although not shown in the drawings, the second marine propulsion device 4R has a similar configuration to the first marine propulsion device 4L.

Figure 5:
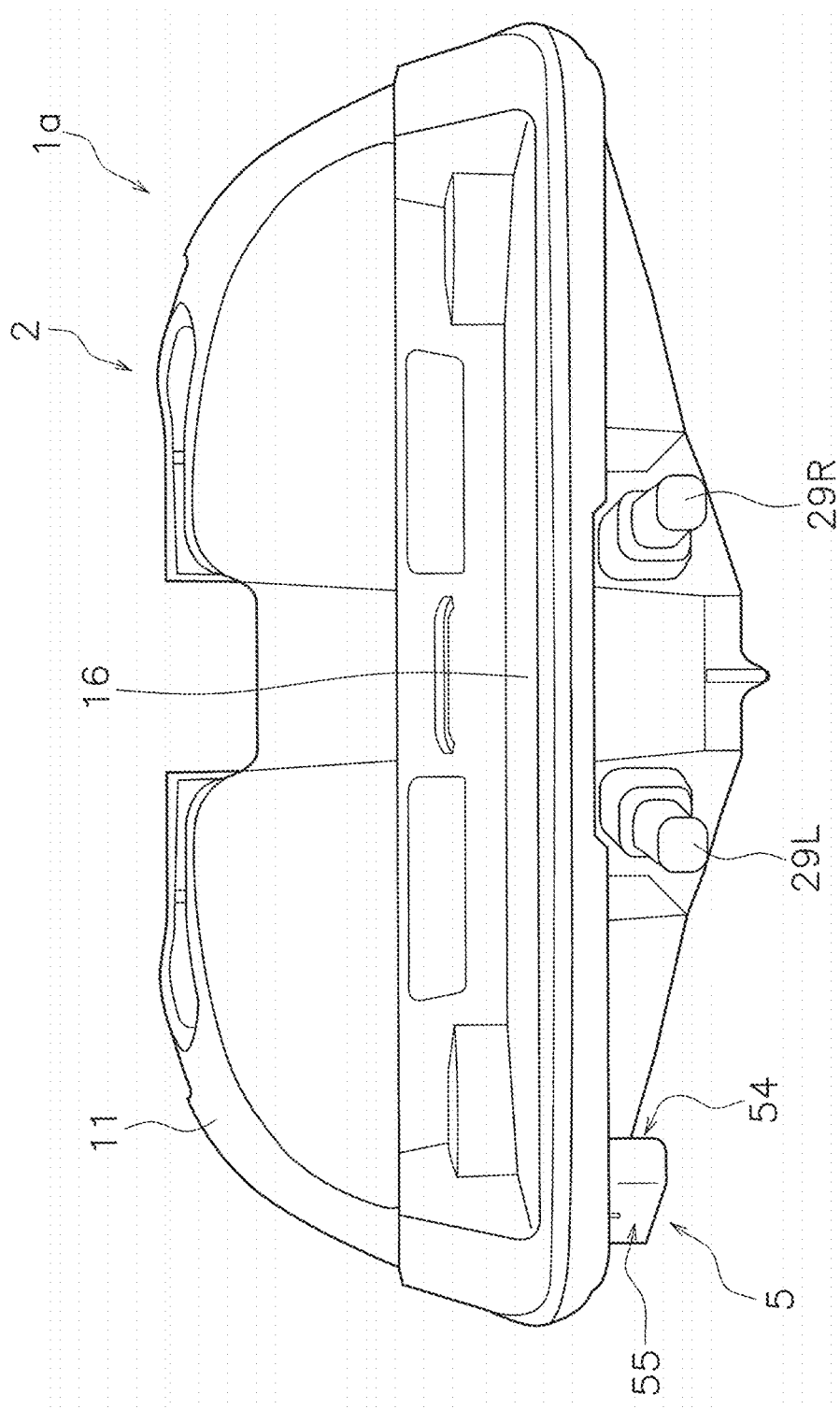
FIG. 5 is a rear view of the watercraft according to the first preferred embodiment of the present invention.
Figure 6:
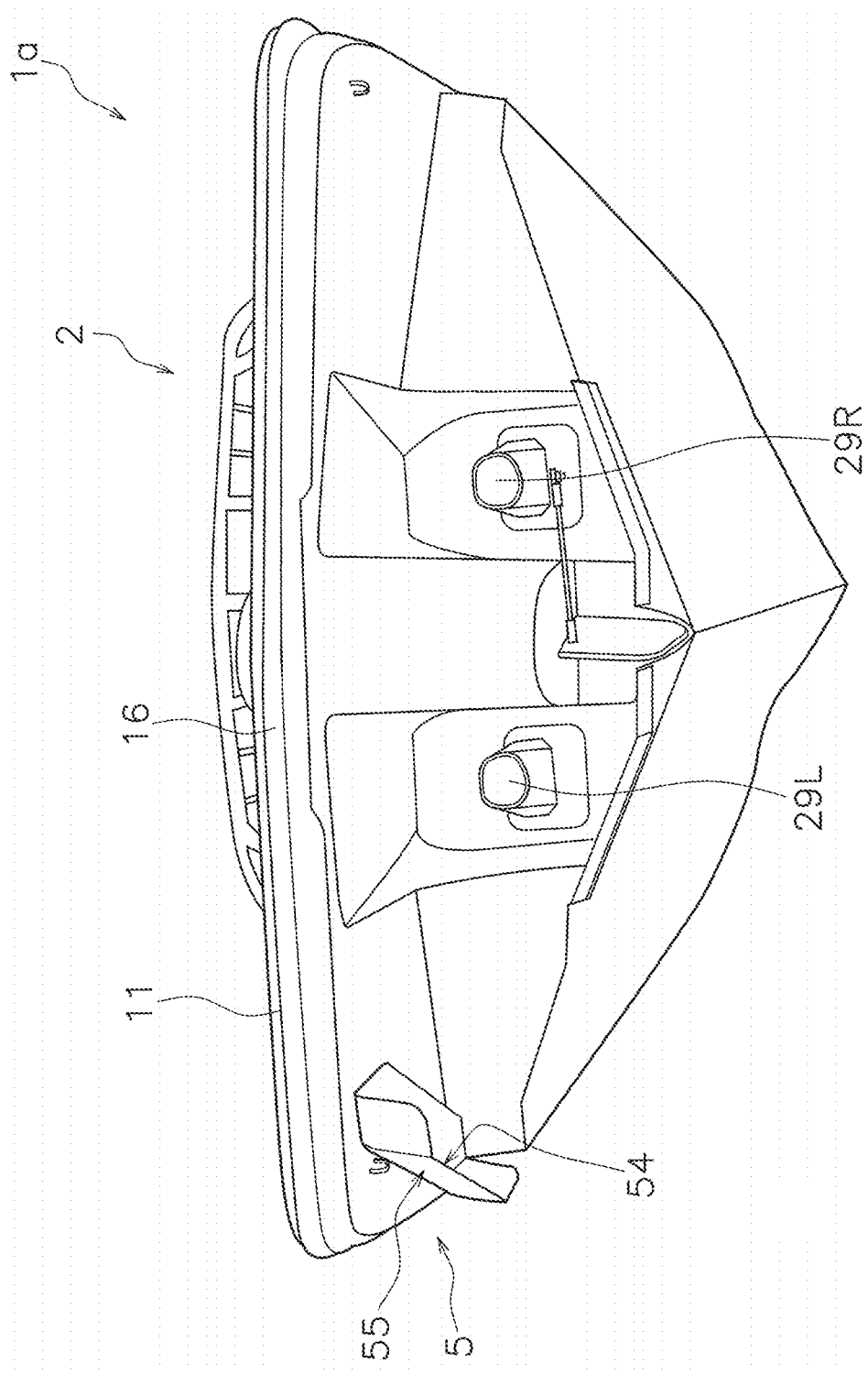
FIG. 6 is a perspective view of a rear portion of the watercraft according to the first preferred embodiment of the present invention.
Figure 7:
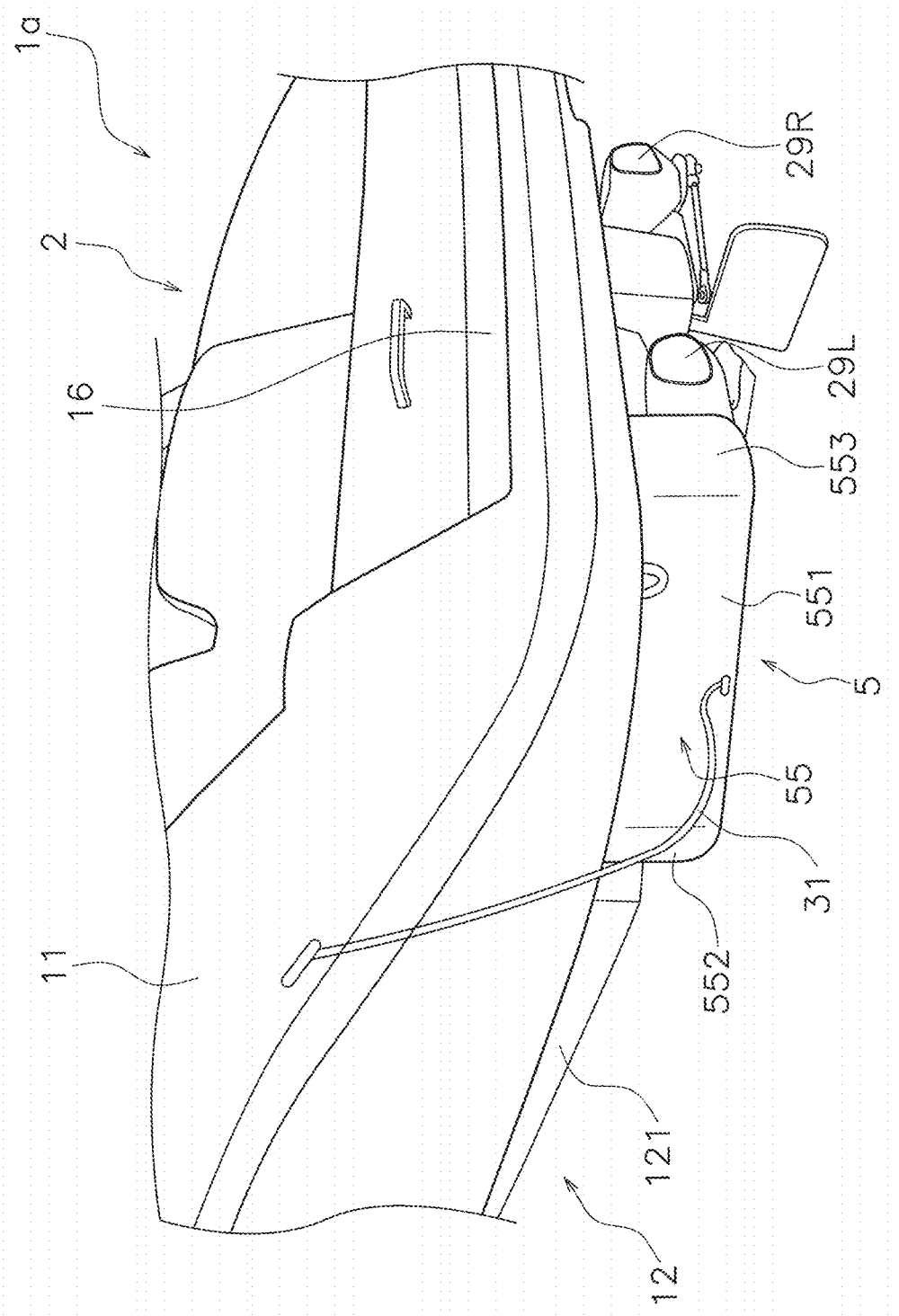
FIG. 7 is a perspective view of the rear portion of the watercraft according to the first preferred embodiment of the present invention.

FIG. 5 is a rear view of the watercraft 1a. FIGS. 6 and 7 are perspective views of the rear portion of the watercraft 1a. As shown in FIGS. 3 to 7, the watercraft 1a includes a guide 5. The guide 5 is attached to the vessel body 2. The guide 5 is attached to the lower surface of the transom step 16. The guide 5 is disposed at a height to cause the guide 5 to be located below the surface of water at a vessel velocity of less than or equal to a predetermined velocity and is also located above the surface of water at a vessel velocity of greater than the predetermined velocity. The predetermined velocity is a velocity at which the watercraft 1a planes. The guide 5 is detachably attached to the vessel body 2.

Figure 8:
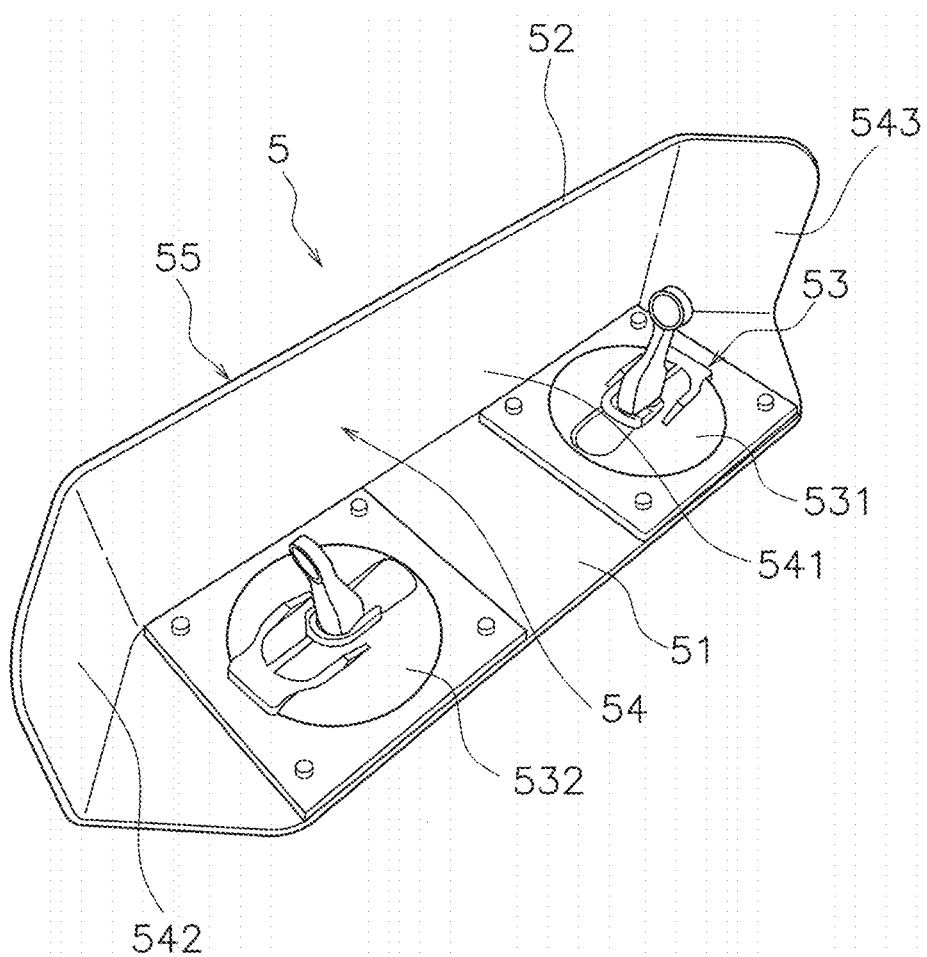
FIG. 8 is a perspective view of a guide according to the first preferred embodiment of the present invention.
Figure 9:
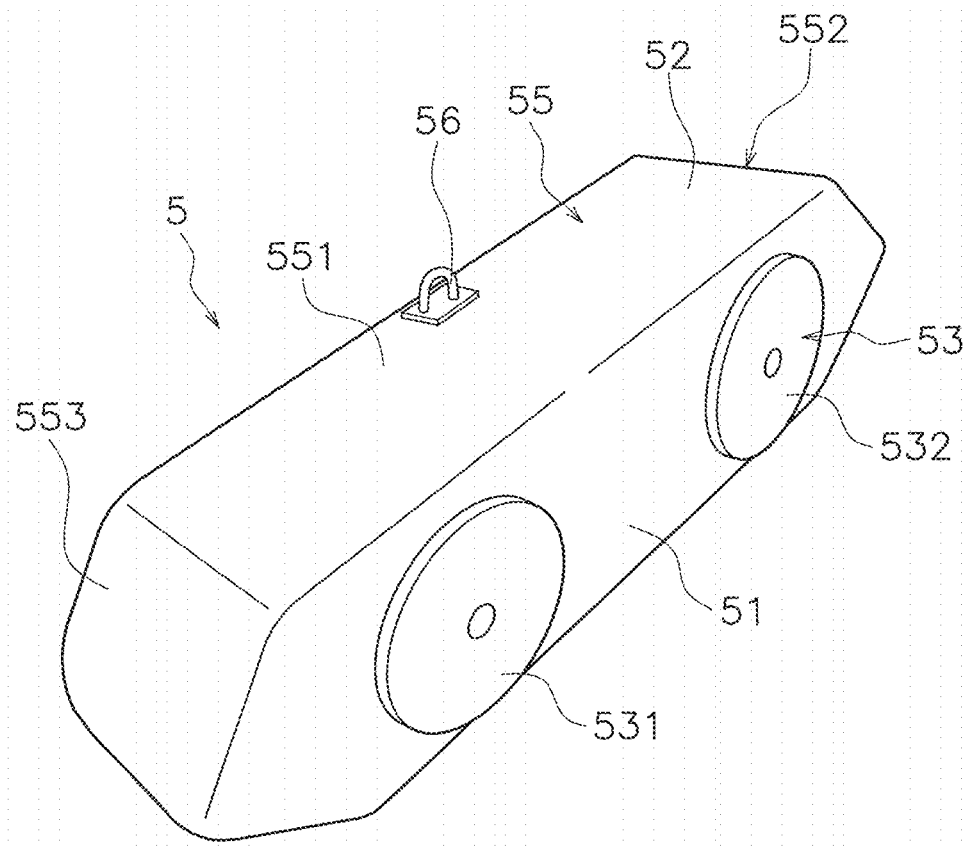
FIG. 9 is a perspective view of the guide according to the first preferred embodiment of the present invention.

FIGS. 8 and 9 are perspective views of the guide 5. As shown in FIGS. 8 and 9, the guide 5 includes a first plate 51, a second plate 52 and a connector 53. The guide 5 has a bent shape between the first plate 51 and the second plate 52. In a condition that the guide 5 is attached to the vessel body 2, the first plate 51 is disposed to face the lower surface of the transom step 16.

The connector 53 is detachably attached to the vessel body 2. The connector 53 is provided on the first plate 51. The connector 53 includes a first suction pad 531 and a second suction pad 532. The first and second suction pads 531 and 532 are disposed in alignment along the lengthwise direction of the first plate 51. It should be noted that the elements of the connector 53 are not limited to the suction pads and may be other connectors or attachments such as bolts.

The second plate 52 includes a first guide surface 54 and a second guide surface 55. The first guide surface 54 is the inner surface of the second plate 52. The second guide surface 55 is the outer surface of the second plate 52. The second guide surface 55 is disposed outside the first guide surface 54.

As shown in FIG. 8, the first guide surface 54 includes a first inner surface 541, a second inner surface 542 and a third inner surface 543. The first inner surface 541 is located between the second inner surface 542 and the third inner surface 543. The first and second inner surfaces 541 and 542 have therebetween a smoothly curved surface shape. The first and third inner surfaces 541 and 543 have therebetween a smoothly curved surface shape.

As shown in FIG. 9, the second guide surface 55 includes a first outer surface 551, a second outer surface 552 and a third outer surface 553. The first outer surface 551 is located between the second outer surface 552 and the third outer surface 553. The first outer surface 551 is located outside the first inner surface 541. The second outer surface 552 is located outside the second inner surface 542. The third outer surface 553 is located outside the third inner surface 543. The first and second outer surfaces 551 and 552 have therebetween a smoothly curved surface shape. The first and third outer surfaces 551 and 553 have therebetween a smoothly curved surface shape.

As shown in FIG. 9, the guide 5 includes a bracket 56 to which a rope 31 is attached. As shown in FIG. 7, the guide 5 is connected to the vessel body 2 through the rope 31. Therefore, loss of the guide 5 is able to be prevented even if the connector 53 of the guide 5 is detached from the vessel body 2 during navigation.

Figure 10:
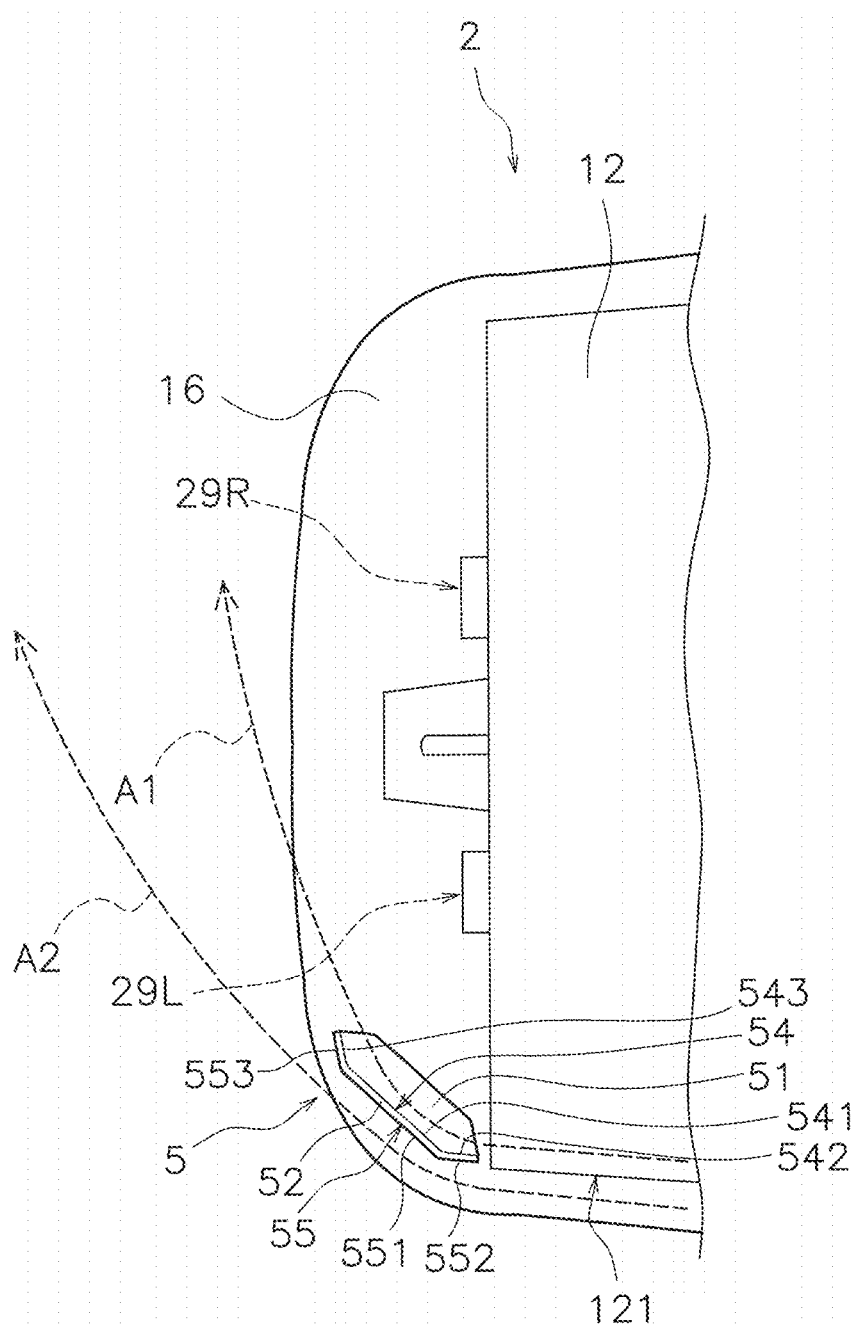
FIG. 10 is an enlarged bottom view of the rear portion of the watercraft according to the first preferred embodiment of the present invention.
Figure 11:
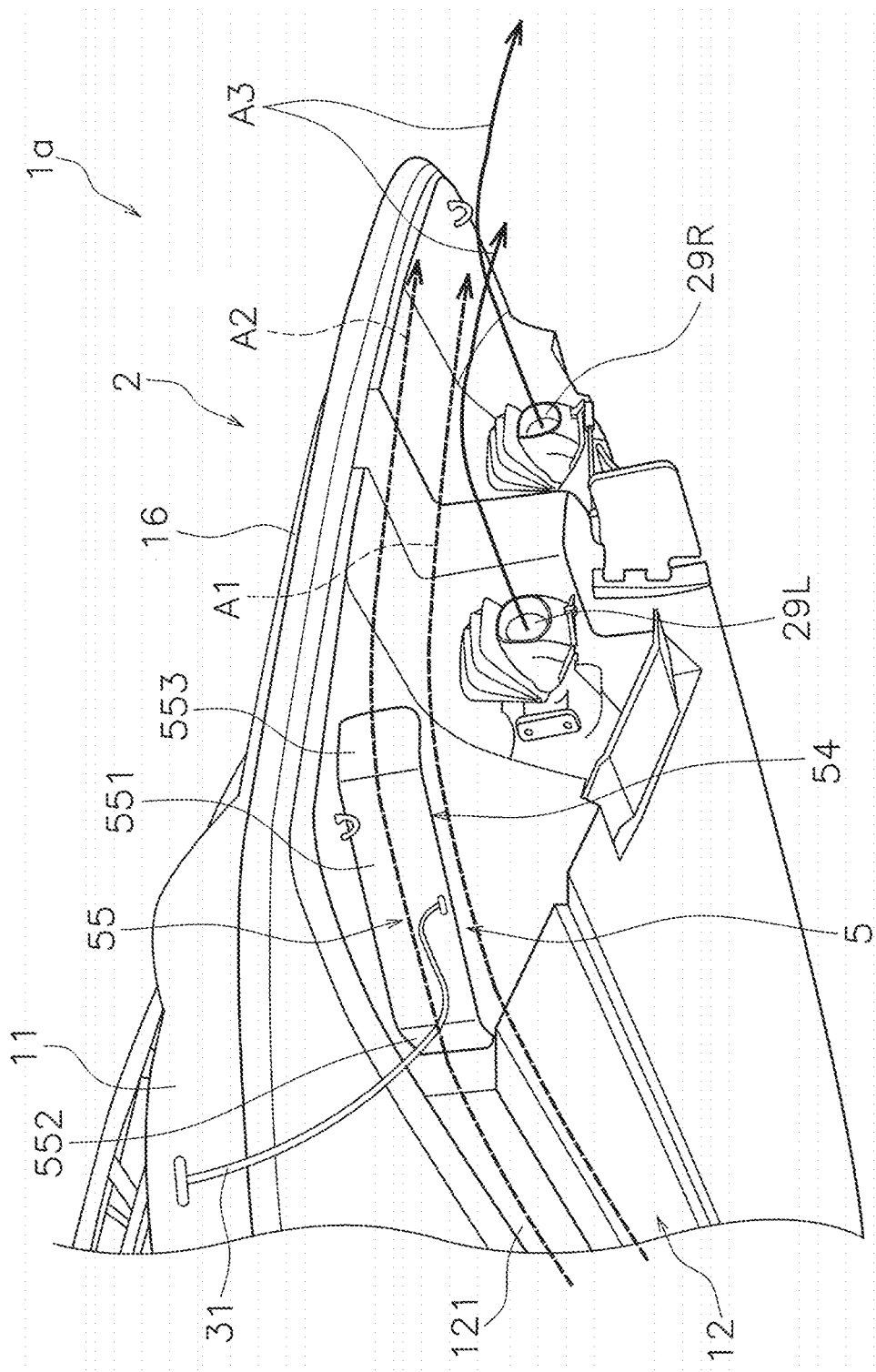
FIG. 11 is a perspective view of the rear portion of the watercraft according to the first preferred embodiment of the present invention.

FIG. 10 is an enlarged bottom view of the rear portion of the vessel body 2. FIG. 11 is a perspective view of the rear portion of the vessel body 2. As shown in FIGS. 10 and 11, the first guide surface 54 extends astern of the vessel body 2 and toward the center of the vessel body 2 in a width direction of the vessel body 2 from a position located sideward of the first and second jet spouts 29L and 29R. As depicted with broken arrow A1 in FIGS. 10 and 11, the first guide surface 54 directs water flowing on a lateral side of the vessel body 2 to a position located behind and above the first and second jet spouts 29L and 29R.

As shown in FIG. 5, the lower end of the first guide surface 54 is disposed above the lower ends of the first and second jet spouts 29L and 29R. The upper end of the first guide surface 54 is disposed above the upper ends of the first and second jet spouts 29L and 29R. When the guide 5 is attached to a position located leftward of the first and second jet spouts 29L and 29R, the first guide surface 54 is located leftward of the left lateral end of the first jet spout 29L.

As shown in FIG. 10, the first inner surface 541 of the first guide surface 54 extends astern of the vessel body 2 and toward the width directional center of the vessel body 2. The second inner surface 542 is disposed in front of the first inner surface 541. The second inner surface 542 extends ahead of the vessel body 2 from the first inner surface 541. The third inner surface 543 extends from the first inner surface 541 toward the width directional center of the vessel body 2.

Similarly to the first guide surface 54, the second guide surface 55 extends astern of the vessel body 2 and toward the width directional center of the vessel body 2 from a position located sideward of the first and second jet spouts 29L and 29R. As depicted with broken arrow A2 in FIGS. 10 and 11, the second guide surface 55 directs water flowing on one lateral side of the vessel body 2 such that the water flowing on the one lateral side of the vessel body 2 flows at a higher flow rate than water flowing on the other lateral side of the vessel body 2.

As shown in FIGS. 10 and 11, the first outer surface 551 of the second guide surface 55 extends astern of the vessel body 2 and toward the width directional center of the vessel body 2. The second outer surface 552 extends ahead of the vessel body 2 from the first outer surface 551. The front end of the second outer surface 552 is disposed behind the rear end of a lateral surface 121 of the vessel body 2. The second outer surface 552 is located inside the lateral surface 121 of the vessel body 2 in the width direction of the vessel body 2. It should be noted that the second outer surface 552 may be disposed to be flush with the left lateral surface of the vessel body 2. The third outer surface 553 extends from the first outer surface 551 toward the width directional center of the vessel body 2.

Figure 12:
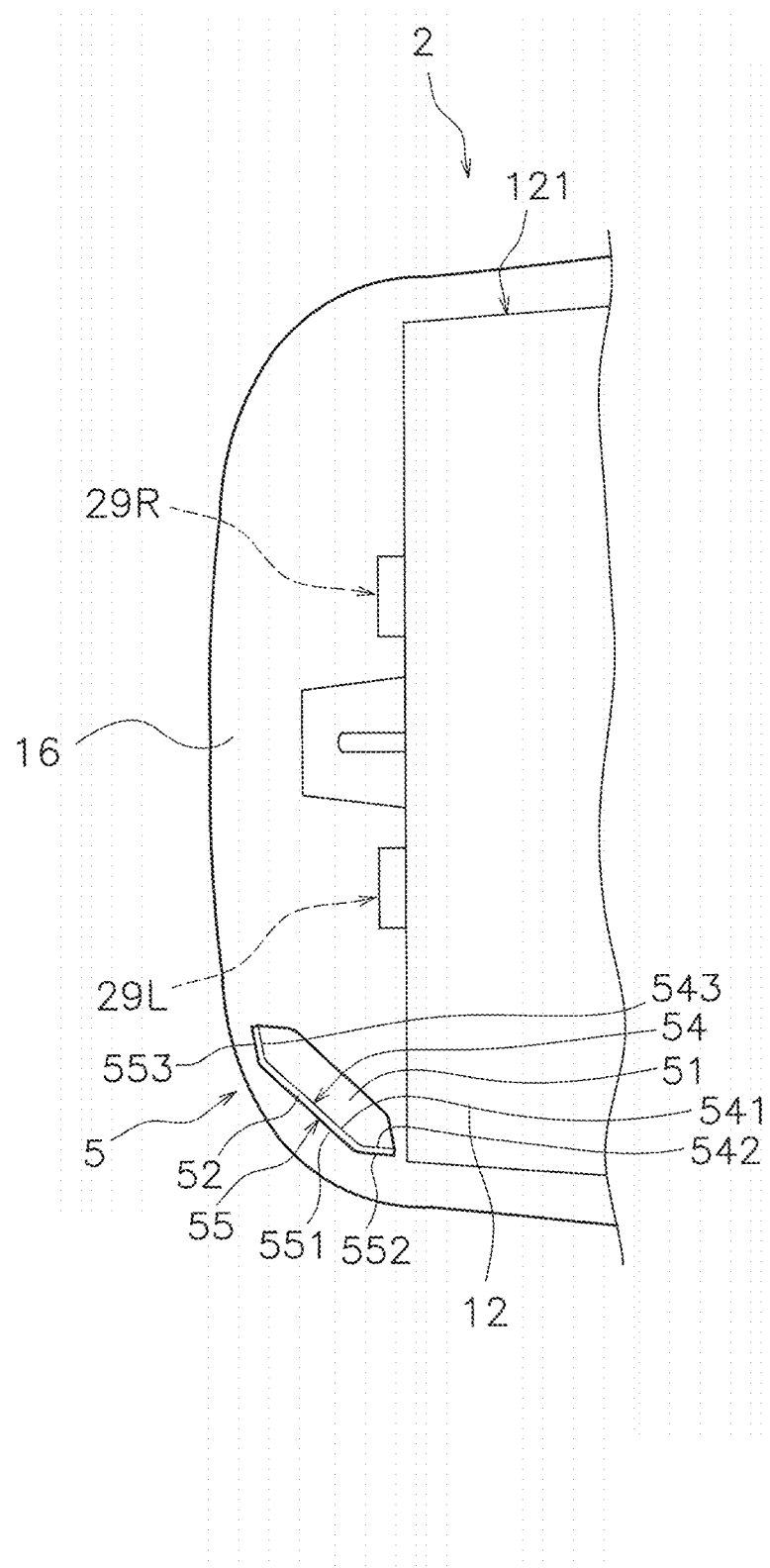
FIG. 12 is an enlarged bottom view of the rear portion of the watercraft according to the first preferred embodiment of the present invention.

In the example explained above, the guide 5 is attached to the vessel body 2 at the position located leftward of the first and second jet spouts 29L and 29R. However, the guide 5 is attachable to and detachable from the vessel body 2. Additionally, the guide 5 has a shape bilaterally symmetrical with reference to a plane passing through the center of the guide 5 in a lengthwise direction of the guide 5. Therefore, the guide 5 is easily detachable from the position located leftward of the first and second jet spouts 29L and 29R as shown in FIG. 10, and is then easily attachable to a position located rightward of the first and second jet spouts 29L and 29R as shown in FIG. 12.

Figure 13:
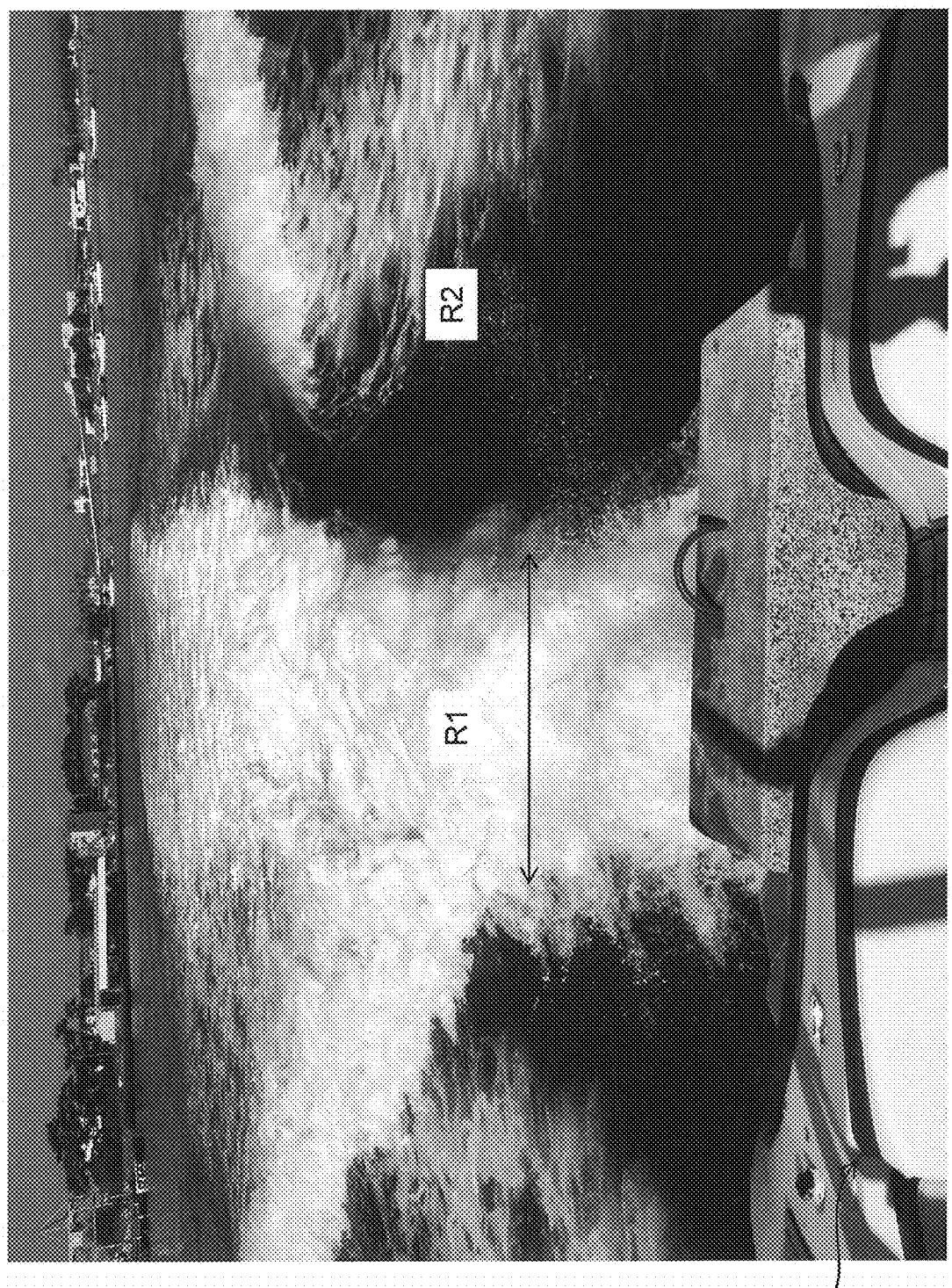
FIG. 13 is a drawing showing a flat wake generated by the guide according to the first preferred embodiment of the present invention.

In the watercraft 1a according to the first preferred embodiment explained above, the water flowing on the lateral side of the vessel body 2 is directed inward in the width direction of the vessel body 2 by the first and second guide surfaces 54 and 55 of the guide 5. The water flowing on the lateral side of the vessel body 2 is directed to the position located behind and above the first and second jet spouts 29L and 29R by the first guide surface 54 of the guide 5. Additionally, the confluent timing of the water flowing on one lateral side of the vessel body 2 and the water flowing on the other lateral side of the vessel body 2 is caused to occur earlier by the second guide surface 55 of the guide 5 than when the guide 5 is not provided on the vessel body 2. In other words, the second guide surface 55 directs the water flowing on one lateral side of the vessel body 2 such that the water flowing on the one lateral side of the vessel body 2 flows at a higher flow rate than the water flowing on the other lateral side of the vessel body 2. Because of this, as depicted with arrows A1 and A2 in FIG. 11, the water flowing on the one lateral side of the vessel body 2 is directed by the guide 5 so as to cover water streams A3 spouted backward through the first and second jet spouts 29L and 29R from above. This prevents generation of water that splashes on the surface of water due to the water streams generated by the marine propulsion devices 4L and 4R, such that a less splashy, flat wake is generated. As a result, as shown in FIG. 13, a region R1, in which water splashes on the surface of water due to the marine propulsion devices 4L and 4R, is narrowed by the water streams directed by the guide 5, and a region R2 of a flat wake preferable for wakesurfing is reliably widened. Accordingly, it is possible to generate a wake for wakesurfing on the same side as the guide 5 disposed on one side from the width directional center of the vehicle body 2.

The guide 5 is attachable to and detachable from the watercraft 1a. Therefore, the guide 5 is easily attachable to the existing watercraft 1a afterward. Additionally, the guide 5 is easily attachable to the rear portion of the watercraft 1a at arbitrarily selected one of the positions located rightward and leftward of the first and second jet spouts 29L and 29R. Therefore, the position of a flat wake is easily changeable depending on the demand of a wakesurfer.

Figure 14:
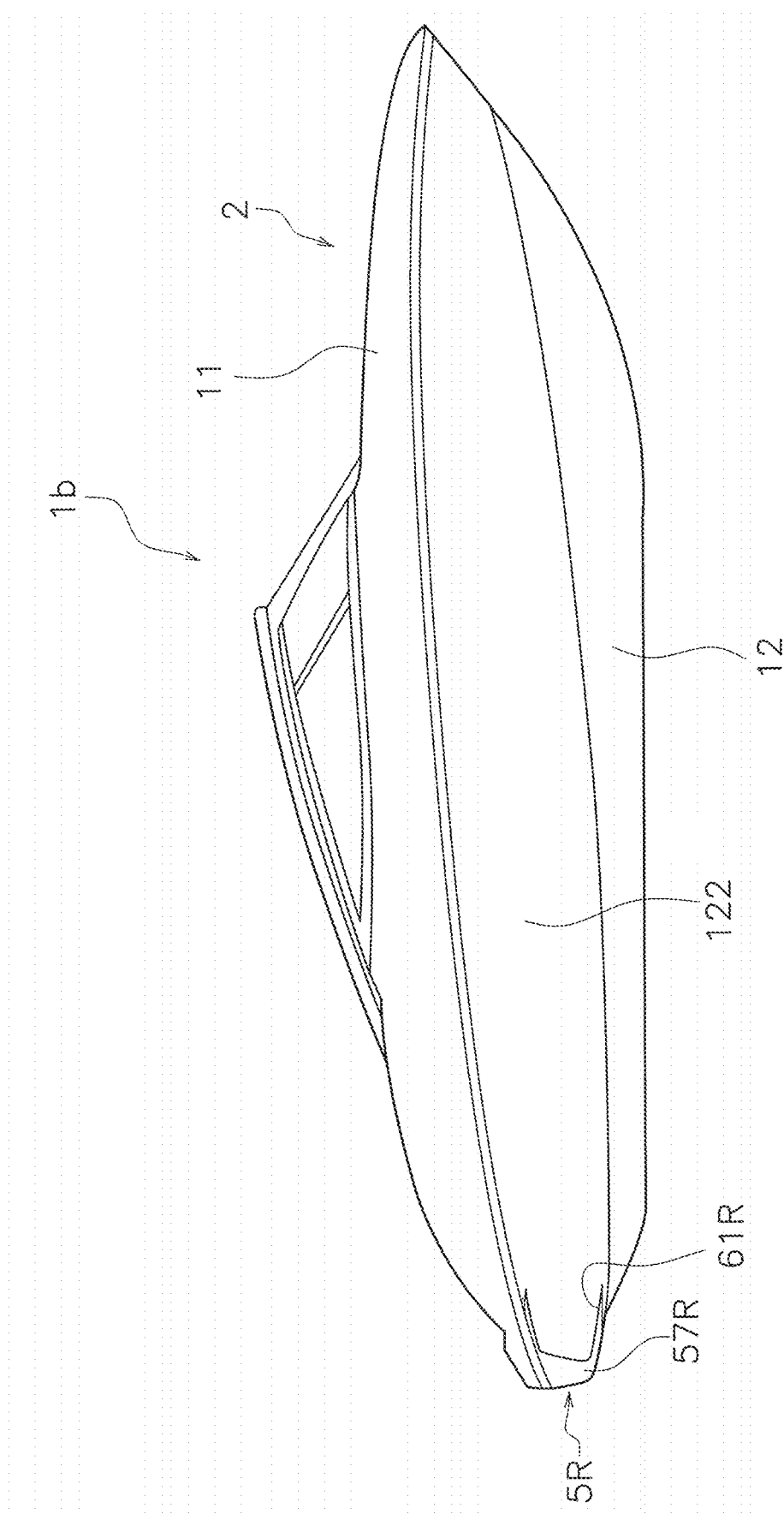
FIG. 14 is a side view of a watercraft according to a second preferred embodiment of the present invention.
Figure 15:
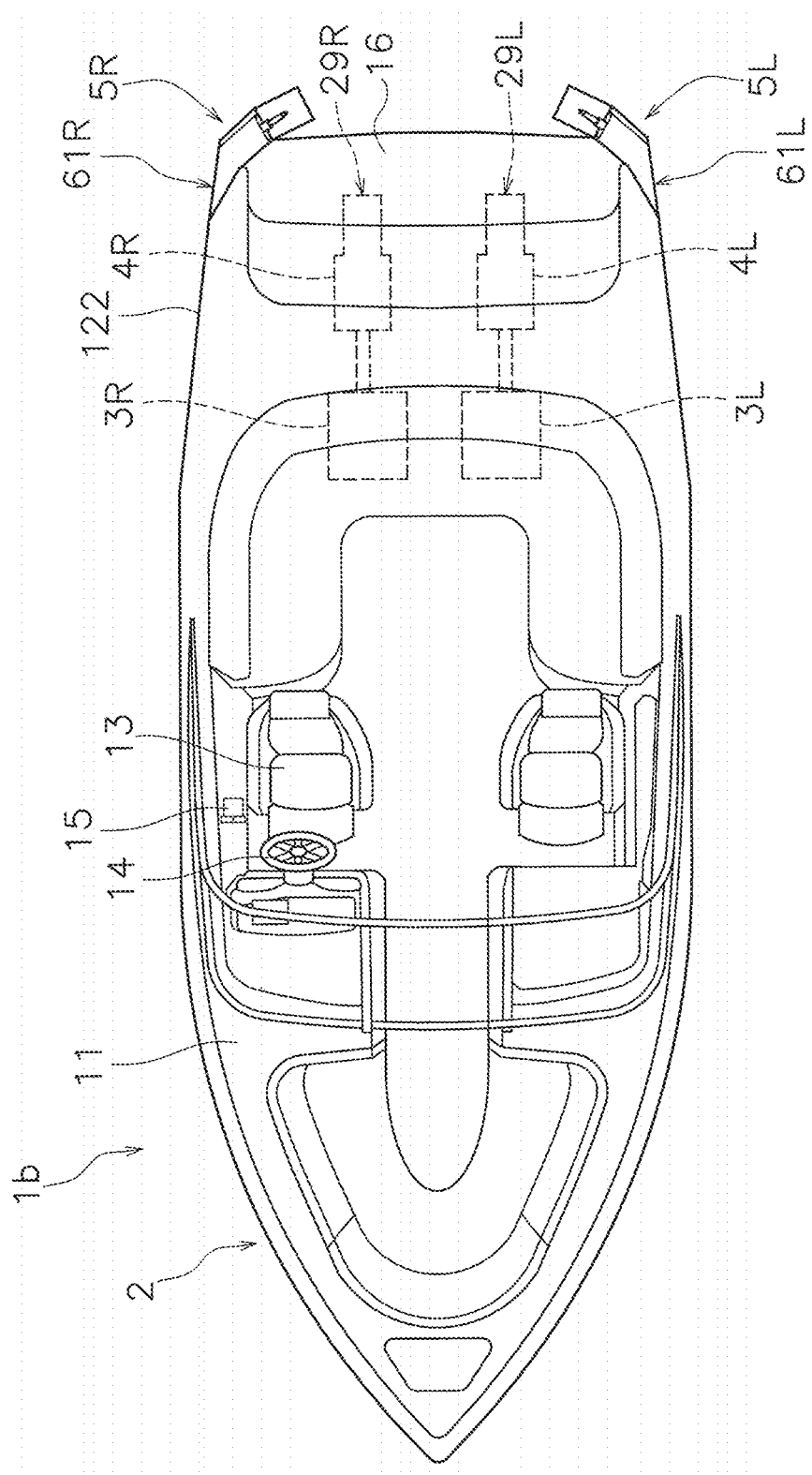
FIG. 15 is a top view of the watercraft according to the second preferred embodiment of the present invention.
Figure 16:
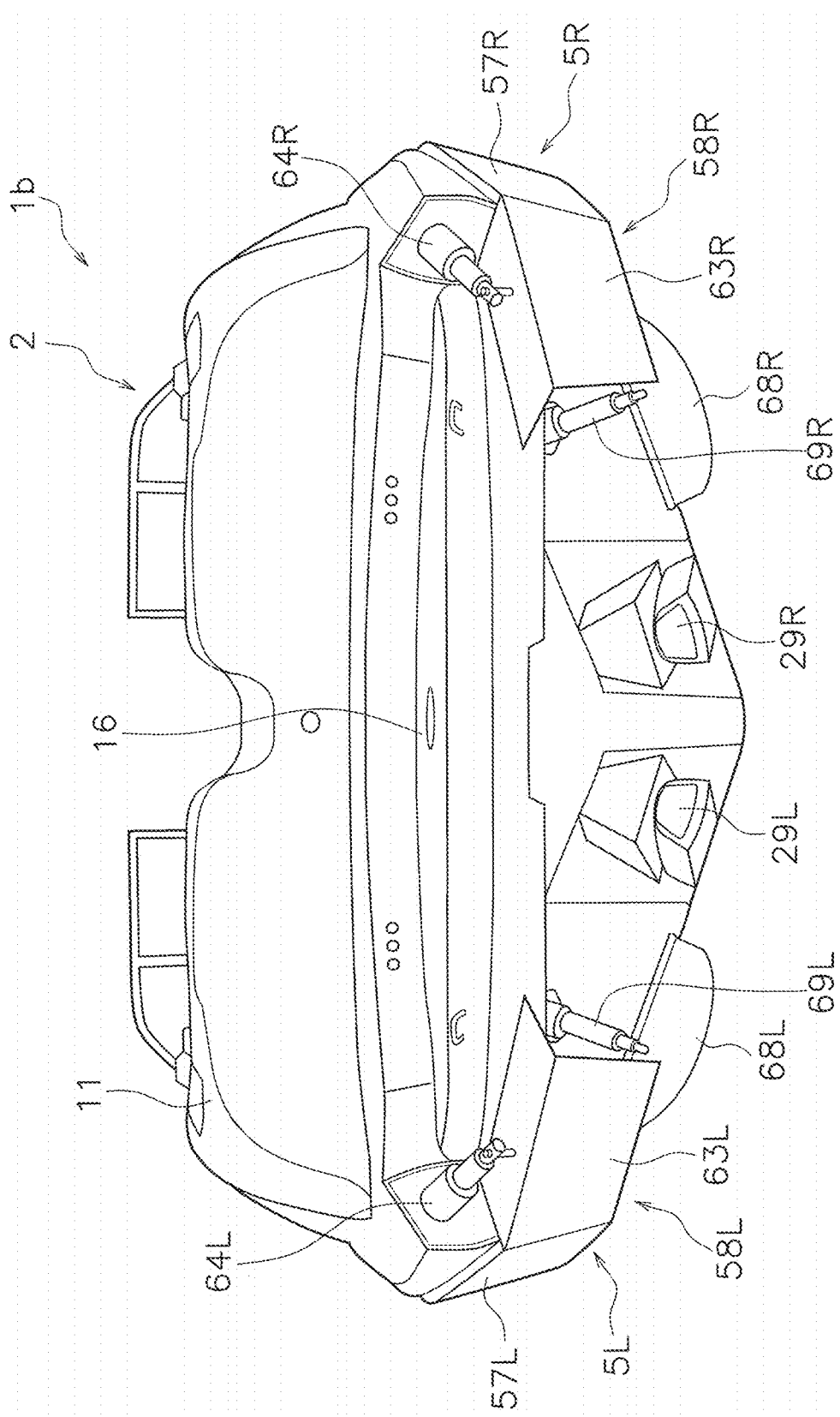
FIG. 16 is a rear view of the watercraft according to the second preferred embodiment of the present invention.

Next, a watercraft 1b according to a second preferred embodiment of the present invention will be explained. FIG. 14 is a side view of the watercraft 1b according to the second preferred embodiment. FIG. 15 is a top view of the watercraft 1b. FIG. 16 is a rear view of the watercraft 1b. As shown in FIGS. 14 to 16, the watercraft 1b includes a right guide 5R and a left guide 5L. It should be noted that the other structures of the watercraft 1b according to the second preferred embodiment is similar to those of the watercraft 1a according to the first preferred embodiment, and the explanation thereof will be omitted.

The right guide 5R is attached to the rear portion of the vessel body 2. The front end of the right guide 5R is disposed behind the rear end of a lateral surface 122 of the vessel body 2. The right guide 5R is disposed rightward of the first and second jet spouts 29L and 29R. The right guide 5R is disposed at a height whereby the right guide 5R is located above the surface of water in planing of the watercraft 1b and is also located below the surface of water in stop and semi-planing (i.e., "hump state") of the watercraft 1b. When located below the surface of water, the right guide 5R directs water flowing on a lateral side of the vessel body 2 to a position located behind and above the first and second jet spouts 29L and 29R.

Figure 17:
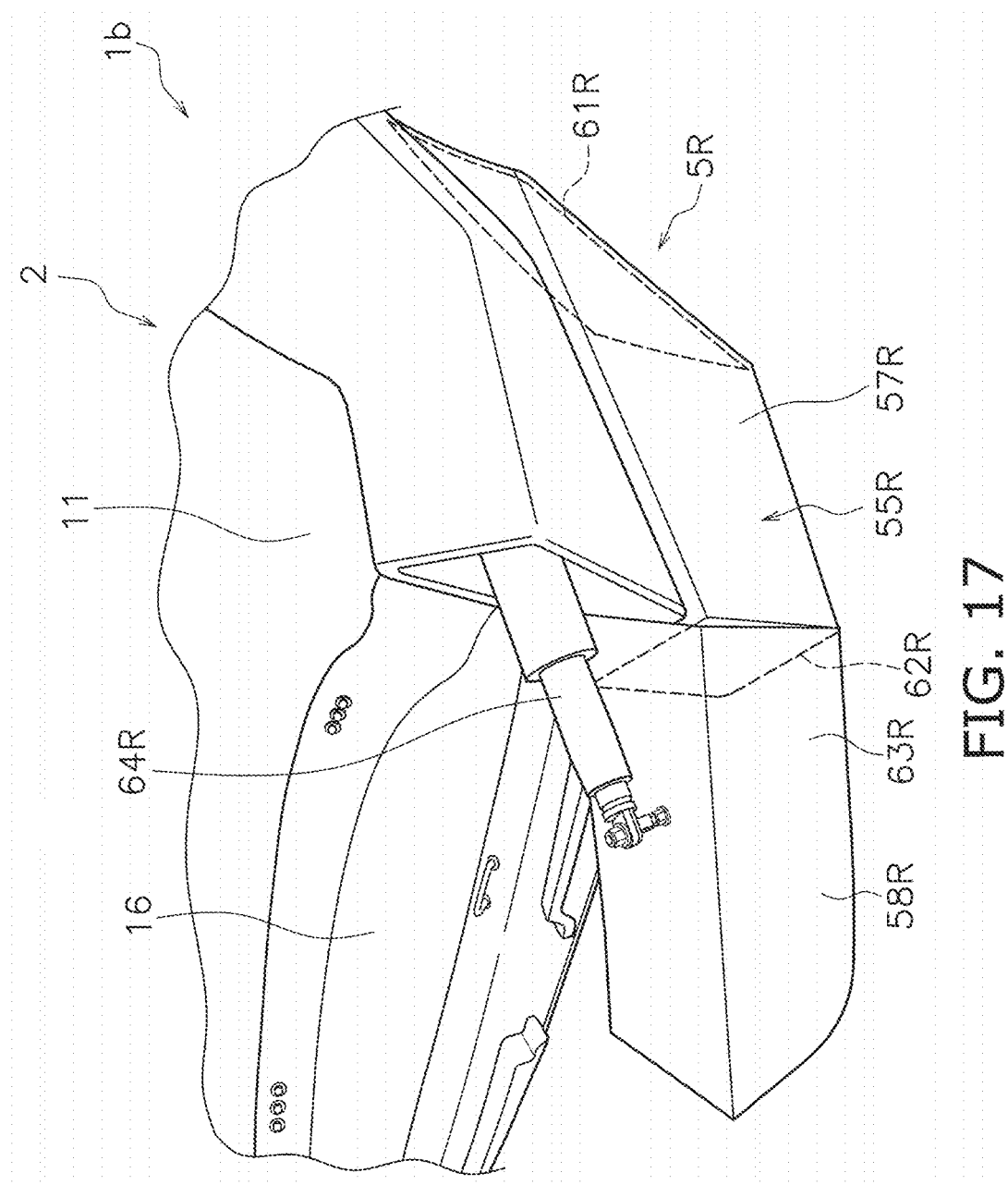
FIG. 17 is an enlarged perspective view of a right guide according to the second preferred embodiment of the present invention.

FIG. 17 is an enlarged perspective view of the right guide 5R. As shown in FIG. 17, the right guide 5R includes a right body guide 57R and a right movable mechanism 58R. The right body guide 57R is attached to the vessel body 2.

The right body guide 57R includes a right inlet 61R that water directed by the right guide 5R enters. The right inlet 61R communicates with an internal pathway in the right body guide 57R. The right inlet 61R is provided in a lateral surface of the right body guide 57R. As shown in FIG. 15, the lateral surface of the right body guide 57R, provided with the right inlet 61R, is disposed to be flush with the lateral surface 122 of the vessel body 2. It should be noted that the lateral surface of the right body guide 57R may be located inside the lateral surface 122 of the vessel body 2 in the width direction of the vessel body 2.

As shown in FIG. 17, the right body guide 57R includes a right outlet 62R through which the water directed by the right guide 5R spouts. The right outlet 62R is located rightward of the right lateral end of the second jet spout 29R. The right outlet 62R is narrower than the right inlet 61R. Therefore, the water taken into the right guide 5R through the right inlet 61R increases in velocity and spouts through the right outlet 62R.

Figure 18:
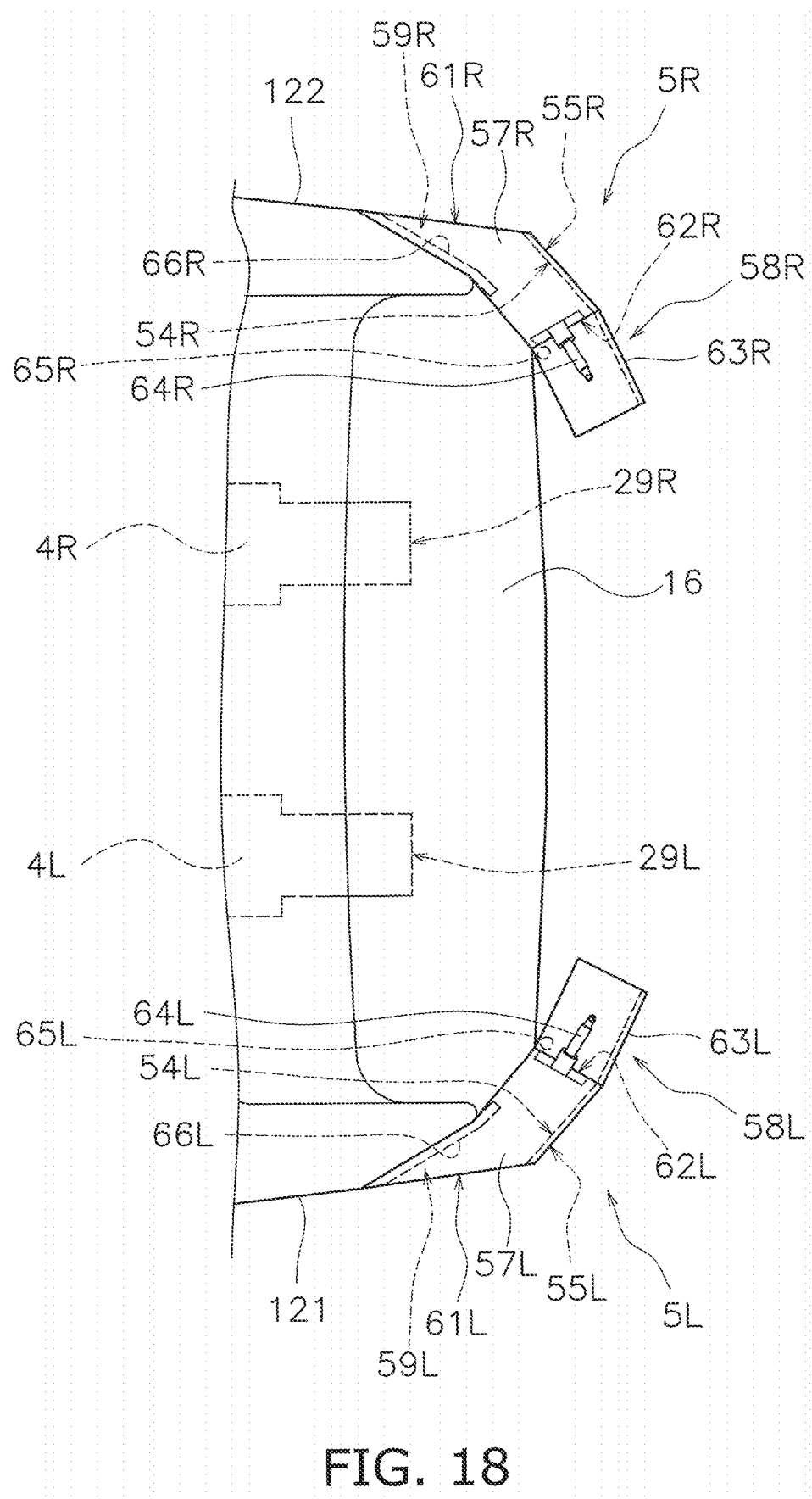
FIG. 18 is an enlarged top view of a rear portion of the watercraft according to the second preferred embodiment of the present invention.

FIG. 18 is an enlarged top view of the rear portion of the watercraft 1b. As shown in FIG. 18, the right body guide 57R includes a first right guide surface 54R and a second right guide surface 55R. The first right guide surface 54R extends astern of the vessel body 2 and toward the width directional center of the vessel body 2 from a position located rightward of the first and second jet spouts 29L and 29R.

The second right guide surface 55R is disposed outside the first right guide surface 54R. Similar to the first right guide surface 54R, the second right guide surface 55R extends astern of the vessel body 2 and toward the width directional center of the vessel body 2 from a position located sideward of the first and second jet spouts 29L and 29R. The second right guide surface 55R directs water flowing on one lateral side of the vessel body 2 such that the water flowing on the one lateral side of the vessel body 2 flows at a higher flow rate than water flowing on the other lateral side of the vessel body 2.

The right movable mechanism 58R includes a right movable guide 63R and a right guide actuator 64R. The right movable guide 63R is provided to be movable with respect to the right body guide 57R. For example, the right movable guide 63R is attached so as to be pivotable about a pivot shaft 65R with respect to the right body guide 57R.

An internal pathway in the right movable guide 63R communicates with that of the right body guide 57R. The lower end of the right movable guide 63R is disposed above the lower ends of the first and second jet spouts 29L and 29R. The upper end of the right movable guide 63R is disposed above the upper ends of the first and second jet spouts 29L and 29R.

The right guide actuator 64R changes the orientation of the right movable guide 63R so as to change the direction of water directed by the right guide 5R. The right guide actuator 64R includes, for instance, a hydraulic cylinder and a hydraulic pump. It should be noted that the elements of the right guide actuator 64R are not limited to the hydraulic cylinder and the hydraulic pump, and may be other types of devices. For example, the right guide actuator 64R may include an electric motor and a gear.

As shown in FIG. 18, the right guide 5R includes a right open/close mechanism 59R. The right open/close mechanism 59R opens or closes the right inlet 61R. The right open/close mechanism 59R includes a right shutter portion 66R shown in FIG. 18 and a right open/close actuator 67R shown in FIG. 19. The right shutter portion 66R is switched between an opened state and a closed state. In the opened state, the right shutter portion 66R opens the right inlet 61R. In the closed state, the right shutter portion 66R closes the right inlet 61R.

The right open/close actuator 67R switches the right shutter portion 66R between the opened state and the closed state. The right open/close actuator 67R includes, for instance, a hydraulic cylinder and a hydraulic pump. It should be noted that the elements of the right open/close actuator 67R are not limited to the hydraulic cylinder and the hydraulic pump, and may be other types of devices. For example, the right open/close actuator 67R may include an electric motor and a gear.

The left guide 5L includes a left body guide 57L, a left movable mechanism 58L and a left open/close mechanism 59L. The left body guide 57L includes a first left guide surface 54L and a second left guide surface 55L. The left body guide 57L includes a left inlet 61L and a left outlet 62L. The left movable mechanism 58L includes a left movable guide 63L and a left guide actuator 64L. The left open/close mechanism 59L includes a left shutter portion 66L and a left open/close actuator 67L. The respective portions of the left guide 5L are structured similarly to corresponding ones of the right guide 5R, and hence, the detailed explanation thereof will be omitted.

As shown in FIG. 16, the watercraft 1b includes a right trim tab 68R and a left trim tab 68L. The right and left trim tabs 68R and 68L are attached to the rear portion of the vessel body 2. Each of the right and left trim tabs 68R and 68L is attached to the vessel body 2 so as to be movable between a stowed position and a trim position. In the stowed position, the right trim tab 68R becomes flush or substantially flush with the vessel bottom (planing surface) of the watercraft 1b and the bottom surface of the right guide 5R. In the stowed position, the left trim tab 68L becomes flush or substantially flush with the vessel bottom (planing surface) of the watercraft 1b and the bottom surface of the left guide 5L. In the trim position, each of the right and left trim tabs 68R and 68L is disposed to protrude downward of the vessel bottom (planing surface).

The watercraft 1b includes a right trim actuator 69R and a left trim actuator 69L. The right trim actuator 69R is attached to the right trim tab 68R. The right trim actuator 69R moves the right trim tab 68R between the stowed position and the trim position. The left trim actuator 69L is attached to the left trim tab 68L. The left trim actuator 69L moves the left trim tab 68L between the stowed position and the trim position. Each of the right and left trim actuators 69R and 69L includes, for instance, a hydraulic cylinder and a hydraulic pump. It should be noted that the elements of each of the right and left trim actuators 69R and 69L are not limited to the hydraulic cylinder and the hydraulic pump, and may be other types of devices. For example, each of the right and left trim actuators 69R and 69L may include an electric motor and a gear.

Figure 19:
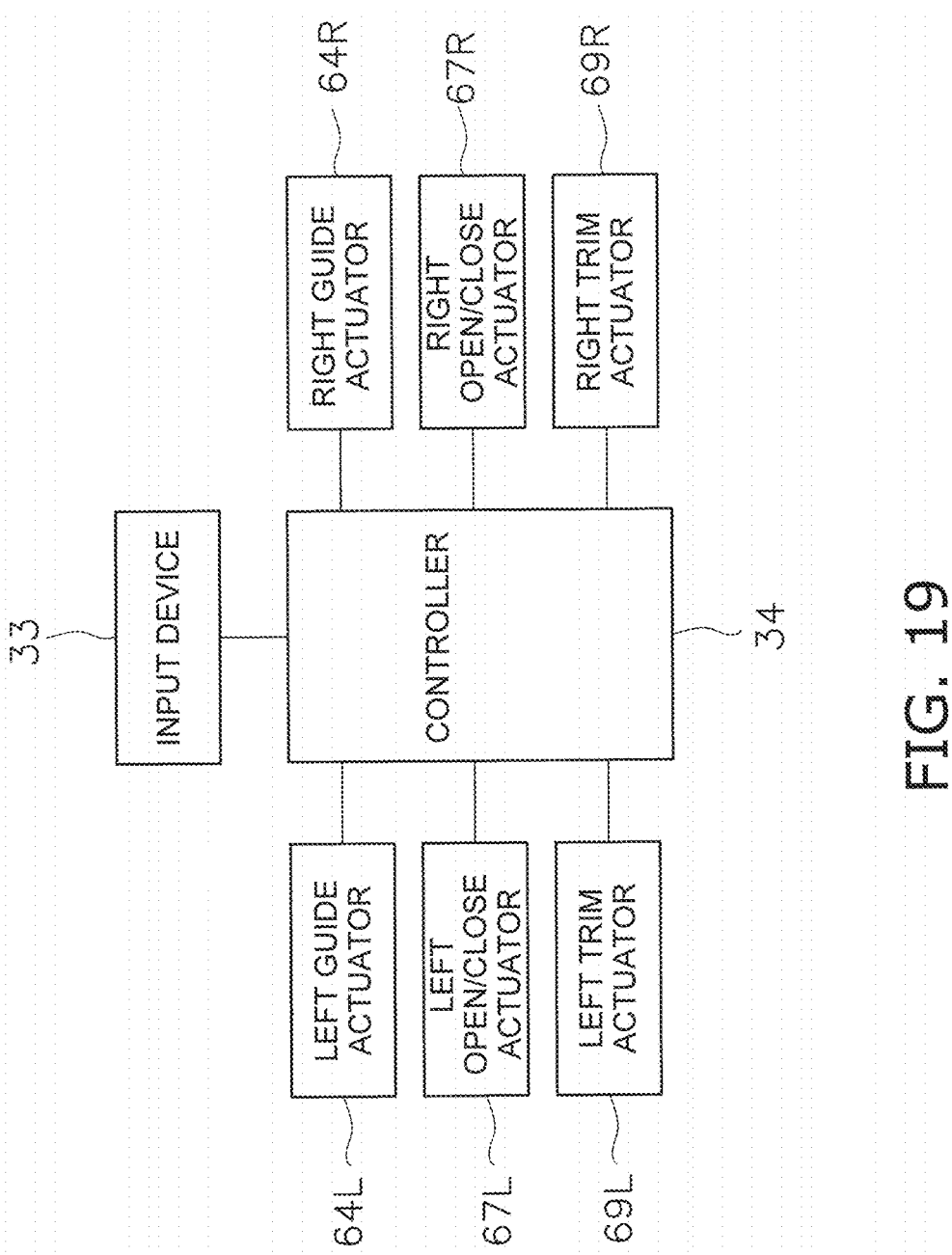
FIG. 19 is a diagram of a control system of the watercraft according to the second preferred embodiment of the present invention.

FIG. 19 is a diagram showing a control system of the watercraft 1b. As shown in FIG. 19, the watercraft 1b includes an input device 33 and a controller 34. The input device 33 is a touchscreen, for instance, and outputs a signal in response to an input operation performed by a user. It should be noted that the input device 33 may be another type of device such as a switch, a lever or so forth. The controller 34 includes, for instance, a processor such as a CPU and memories such as a RAM and a ROM.

The controller 34 is connected to the input device 33, the right and left guide actuators 64R and 64L, the right and left open/close actuators 67R and 67L, and the right and left trim actuators 69R and 69L through wired or wireless communication. The controller 34 actuates the right and left movable mechanisms 58R and 58L in response to the operation of the input device 33 by the user. The controller 34 actuates the right and left open/close mechanisms 59R and 59L in response to the operation of the input device 33 by the user. The controller 34 actuates the right and left trim actuators 69R and 69L in response to the operation of the input device 33 by the user.

The controller 34 changes the orientation of the right movable guide 63R by controlling the right guide actuator 64R in response to the operation of the input device 33 by the user. Accordingly, the direction of water directed by the right guide 5R is able to be changed. The controller 34 changes the orientation of the left movable guide 63L by controlling the left guide actuator 64L in response to the operation of the input device 33 by the user. Accordingly, the direction of water directed by the left guide 5L is able to be changed.

The controller 34 is capable of selecting either of the right and left guides 5R and 5L by controlling the right and left guide actuators 64R and 64L in response to the operation of the input device 33 by the user. For example, when the right guide 5R is selected by the input device 33, the controller 34 opens the right inlet 61R and closes the left inlet 61L by controlling the right and left guide actuators 64R and 64L. Accordingly, a flat wake is able to be generated by the right guide 5R. When the left guide 5R is selected by the input device 33, the controller 34 opens the left inlet 61L and closes the right inlet 61R by controlling the right and left guide actuators 64R and 64L. Accordingly, a flat wake is able to be generated by the left guide 5L. Alternatively, when non-use of the right and left guides 5R and 5L is selected by the input device 33, the controller 34 closes the right and left inlets 61R and 61L by controlling the right and left guide actuators 64R and 64L.

When the right guide 5R is selected, the controller 34 disposes the right trim tab 68R in the stowed position and disposes the left trim tab 68L in the trim position. When the left guide 5L is selected, the controller 34 disposes the left trim tab 68L in the stowed position and disposes the right trim tab 68R in the trim position.

Similar to the watercraft 1b according to the second preferred embodiment explained above, a region of a flat wake preferable for wakesurfing is able to be reliably widened by the right guide 5R or the left guide 5L.

Additionally, when a flat wake is generated by the right guide 5R, the direction of a water stream spouted from the right guide 5R is able to be changed by the right movable mechanism 58R. When a flat wake is generated by the left guide 5L, the direction of a water stream spouted from the left guide 5L is able to be changed by the left movable mechanism 58L. Accordingly, a wake more preferable for wakesurfing is able to be generated.

Furthermore, when the right guide 5R is selected, the right trim tab 68R is disposed in the stowed position, whereas the left trim tab 68L is disposed in the trim position. Accordingly, the vessel body 2 tilts rightward such that water is able to be easily taken into the right guide 5R from the vessel side. Additionally, the vessel body 2 submerges as deeply as possible into the surface of water on which wakesurfing occurs such that a wake is able to be generated as much as possible. Moreover, when disposed in the stowed position, the right trim tab 68R becomes flush or substantially flush with the vessel bottom and the bottom surface of the right guide 5R. Accordingly, the right guide 5R is able to be prevented from affecting generating a wake. It should be noted that when the left guide 5L is selected, an advantageous effect similar to the above is able to be obtained too.

Some preferred embodiments of the present invention have been explained above. However, the present invention is not limited to the aforementioned preferred embodiments, and a variety of changes can be made without departing from the gist of the present invention.

Figure 20:
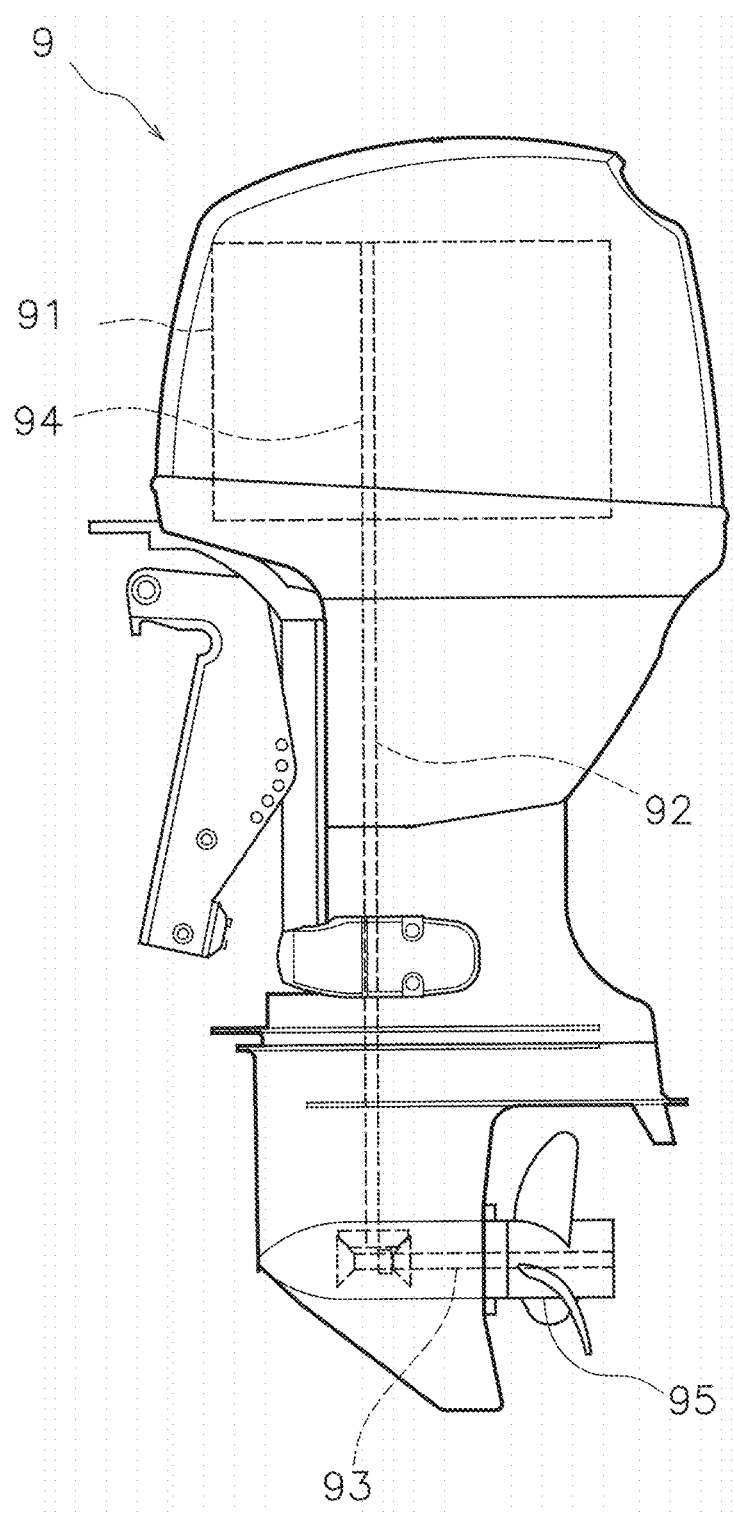
FIG. 20 is a diagram of another exemplary marine propulsion device.

The marine propulsion device is not limited to the jet propulsion device described above, and may be another type of device. For example, the marine propulsion device may be an outboard motor 9 shown in FIG. 20. The outboard motor 9 includes, for instance, an engine 91, a drive shaft 92 and a propeller shaft 93. A crankshaft 94 of the engine 91 is connected to the drive shaft 92. The propeller shaft 93 is connected to the drive shaft 92. A propeller 95 is connected to the propeller shaft 93. When the marine propulsion device is the outboard motor 9, a water stream generator thereof may be the propeller 95 of the outboard motor 9.

The guide 5 according to the first preferred embodiment may be integrated with the vessel body 2. In the second preferred embodiment, the right body guide 57R of the right guide 5R and the left body guide 57L of the left guide 5L may be integrated with the vessel body 2.

The right and left movable mechanisms 58R and 58L may be manually actuated. Alternatively, the right and left movable mechanisms 58R and 58L may be omitted. The right and left open/close mechanisms 59R and 59L may be manually actuated. Alternatively, the right and left open/close mechanisms 59R and 59L may be omitted.

In regulating a wake flatly, the controller 34 may dispose the right and left movable guides 63R and 63L such that only one of the right and left movable guides 63R and 63L extends astern of the vessel body 2 and toward the width directional center of the vessel body 2 whereas the other thereof extends straight with respect to the back-and-forth direction of the vessel body 2. For example, when the right guide 5R is selected by the input device 33, the controller 34 may dispose the right and left movable guides 63R and 63L such that the right movable guide 63R extends astern of the vessel body 2 and toward the width directional center of the vessel body 2 whereas the left movable guide 63L extends straight with respect to the back-and-forth direction of the vessel body 2. When the left guide 5L is selected by the input device 33, the controller 34 may dispose the right and left movable guides 63R and 63L such that the left movable guide 63L extends astern of the vessel body 2 and toward the width directional center of the vessel body 2 whereas the right movable guide 63R extends straight with respect to the back-and-forth direction of the vessel body 2. It should be noted that in not regulating a wake flatly by the right and left guides 5R and 5L, the controller 34 may dispose both of the right and left movable guides 63R and 63L in a straight orientation with respect to the back-and-forth direction of the vessel body 2.

Figure 21:
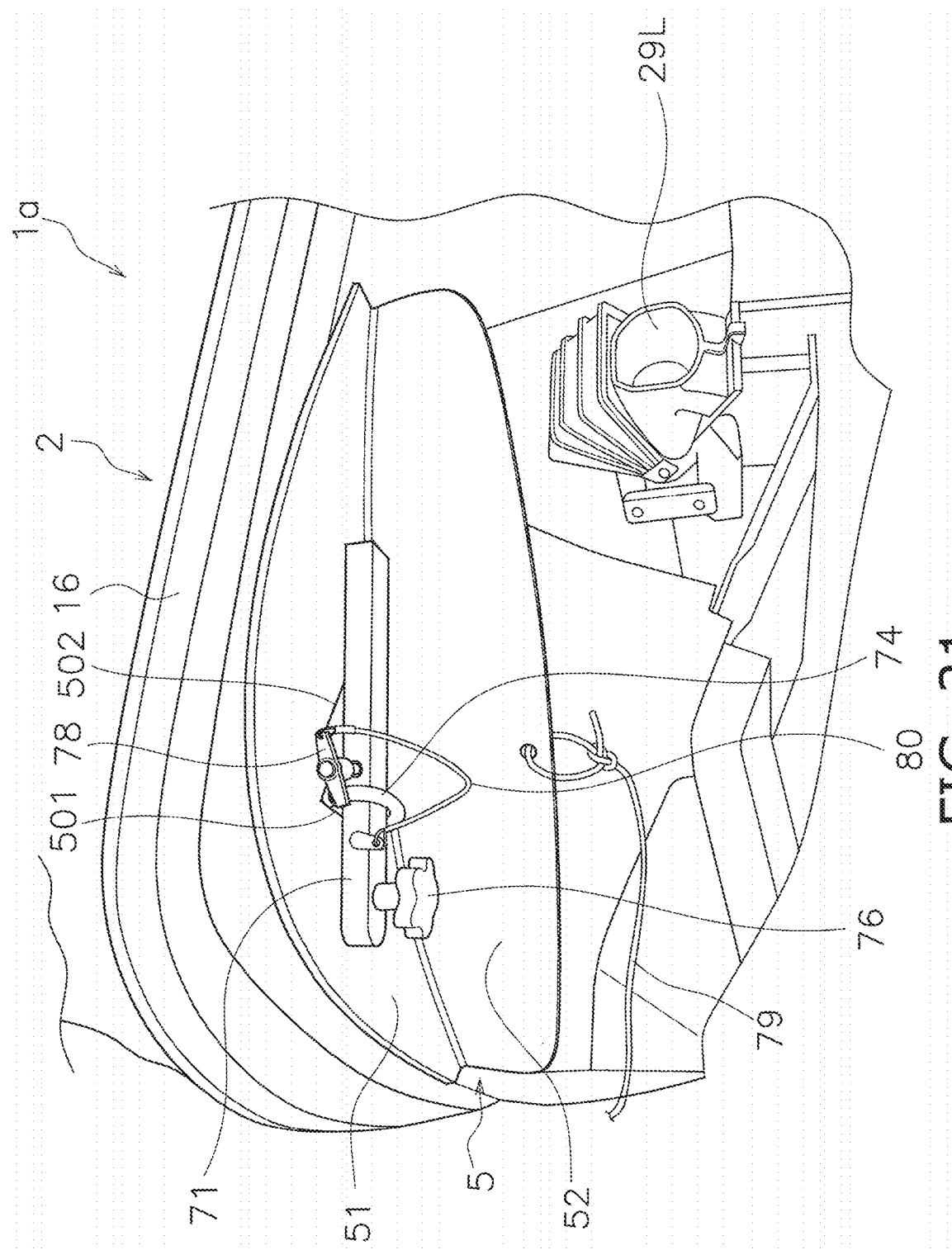
FIG. 21 is a view of a watercraft according to a first modification of the first preferred embodiment of the present invention.
Figure 22:
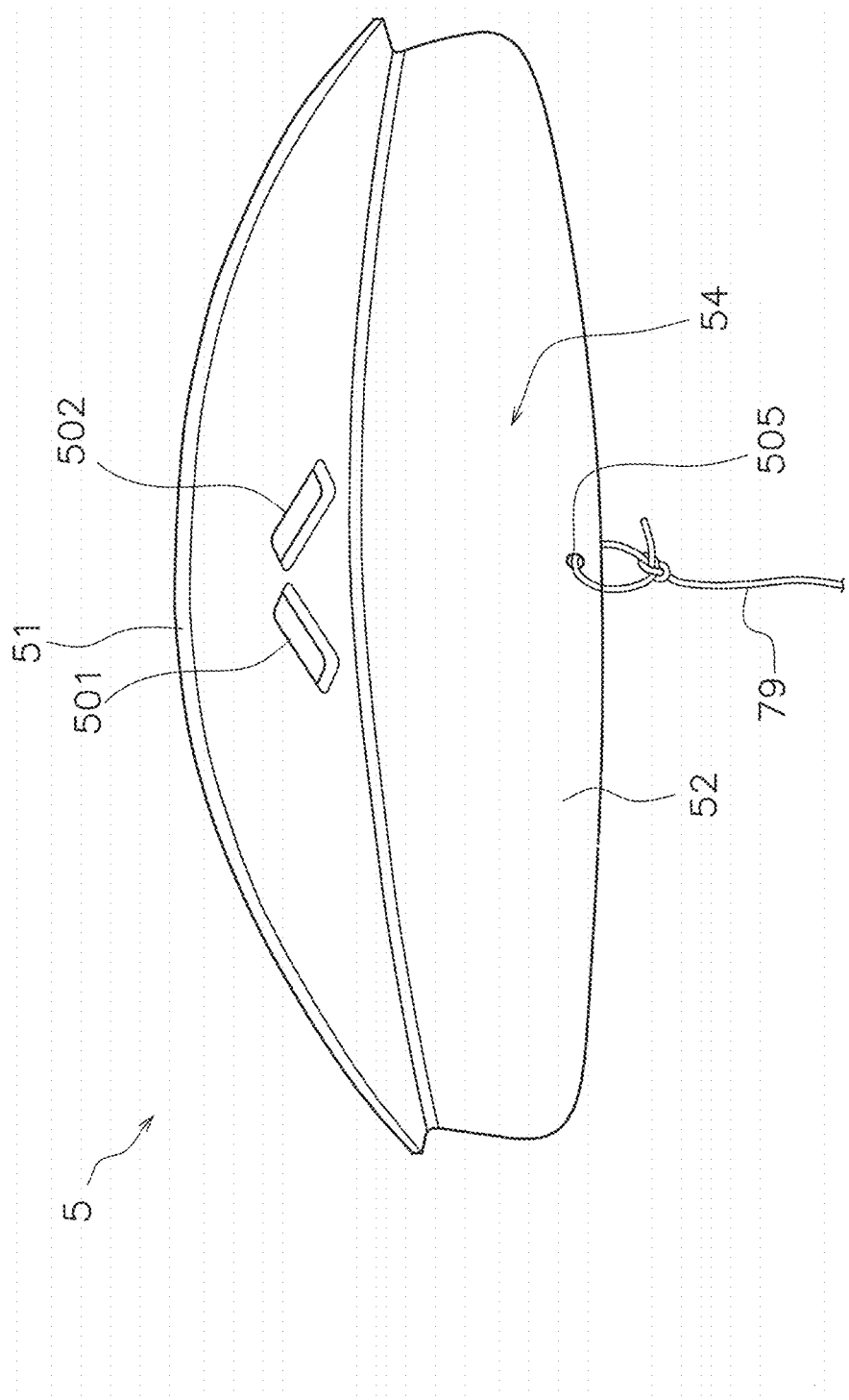
FIG. 22 is a view of a guide according to the first modification of the first preferred embodiment of the present invention.

The structure of the guide is not limited to that in the first preferred embodiment, and may be changed. FIG. 21 is a view of the watercraft 1a according to a first modification of the first preferred embodiment. In the watercraft 1a according to the first modification, the guide 5 is fixed to the vessel body 2 by a latch bar 71. FIG. 22 is a view of the guide 5 according to the first modification. Reference signs assigned to elements in FIG. 22 are the same as those assigned to corresponding ones in the first preferred embodiment. As shown in FIG. 22, the guide 5 includes a first opening 501 and a second opening 502. The first and second openings 501 and 502 are provided in the first plate 51. As shown in FIG. 21, an eye fastener 74 is disposed on the bottom portion of the watercraft 1a. When the guide 5 is attached to the port side of the watercraft 1a, the first opening 501 is penetrated by the eye fastener 74.

Figure 23:
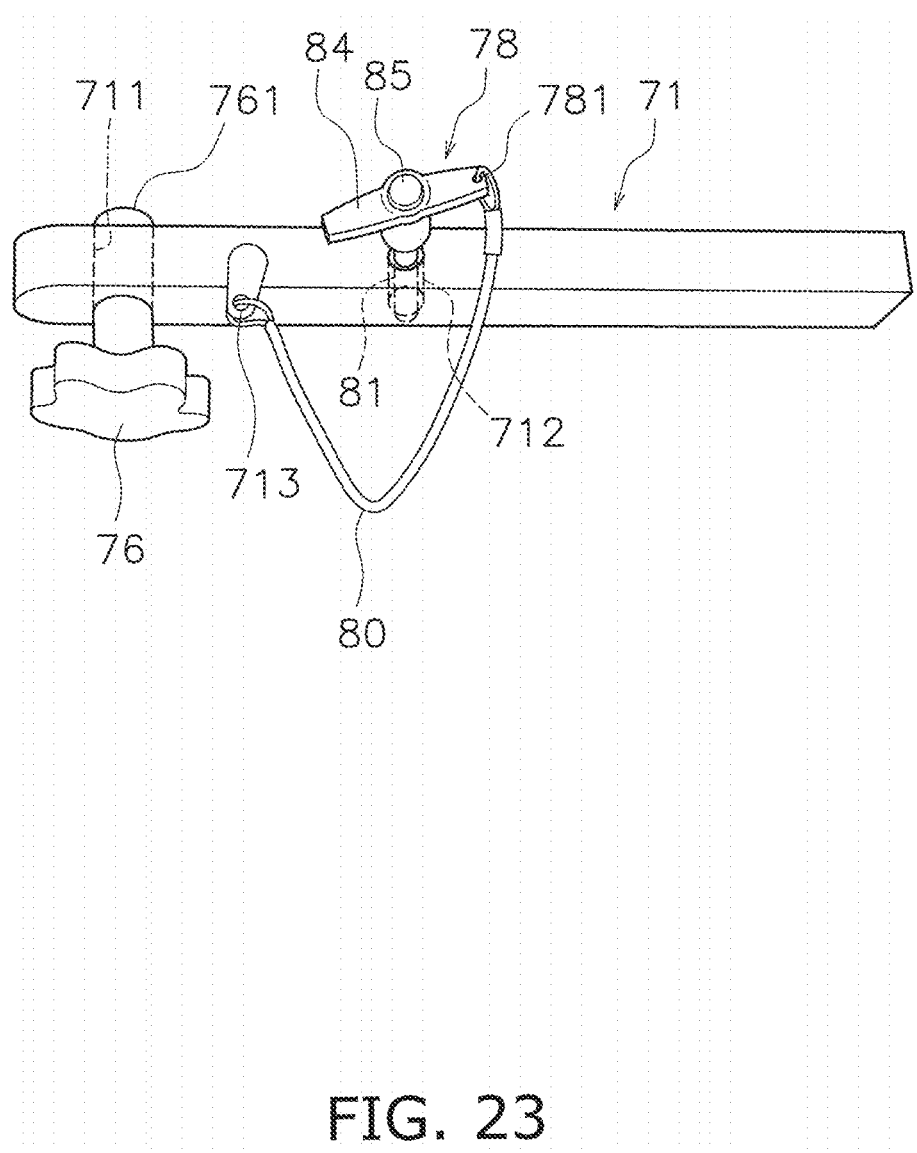
FIG. 23 is an enlarged view of a latch bar.

The eye faster 74 protrudes from the first opening 501, while penetrating therethrough. Under the condition, the latch bar 71 is inserted into the eye fastener 74. FIG. 23 is an enlarged view of the latch bar 71. As shown in FIG. 23, the latch bar 71 includes a first hole 711. The first hole 711 penetrates through the latch bar 71, and is provided with female threads. A fastener 76, provided with male threads thereon, is screwed into the first hole 711. A distal end 761 of the fastener 76 presses the guide 5 while protruding from the first hole 711 such that the latch bar 71 is fixed to the guide 5.

Figure 24:
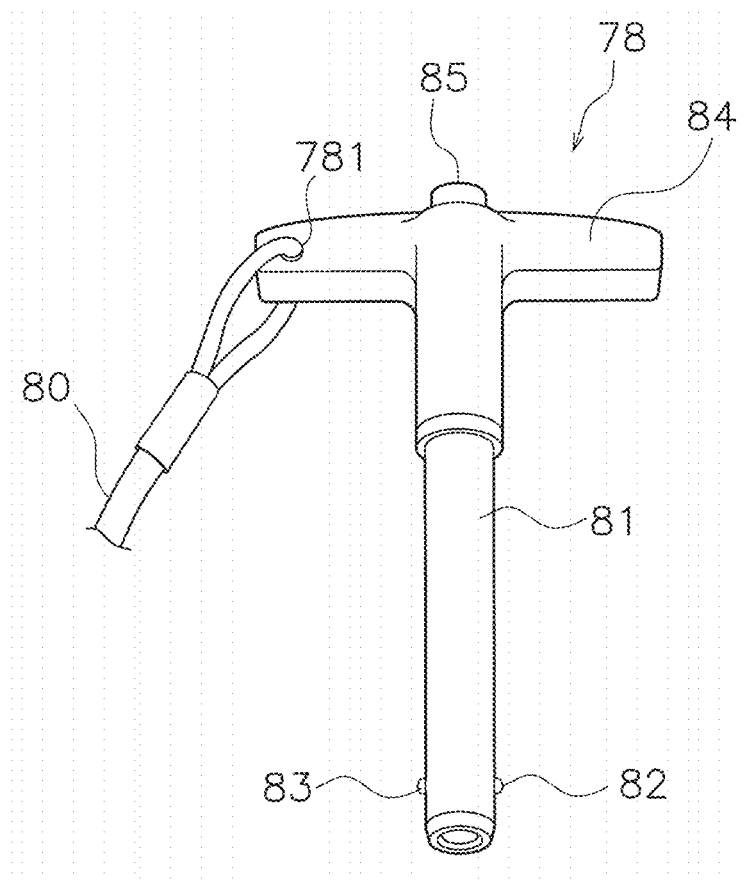
FIG. 24 is an enlarged view of a retainer.

Additionally, the latch bar 71 includes a second hole 712. The second hole 712 penetrates through the latch bar 71. A retainer 78 is inserted into the second hole 712. FIG. 24 is an enlarged view of the retainer 78.

The retainer 78 includes a shaft portion 81, protruding portions 82 and 83, a handle portion 84 and a switch 85. The shaft portion 81 is inserted into the second hole 712. The protruding portions 82 and 83 are provided on the distal end of the shaft portion 81. The handle portion 84 is provided on the base end of the shaft portion 81. The switch 85 is provided on the handle portion 84. While the switch 85 is being pressed, the protruding portions 82 and 83 are retracted into the shaft portion 81. While the switch 85 is not being pressed, the protruding portions 82 and 83 are protruded from the shaft portion 81.

The protruding portions 82 and 83 are engaged with the latch bar 71 while the retainer 78 is inserted into the second hole 712 such that the retainer 78 is fixed to the latch bar 71. The eye fastener 74 is located between the fastener 76 and the retainer 78. Therefore, the latch bar 71 is prevented from coming off from the eye fastener 74 by the retainer 78. Accordingly, the guide 5 is able to be prevented from being detached and dropping from the watercraft 1*a*.

As shown in FIG. 23, the latch bar 71 is provided with a first coupling portion 713. The retainer 78 is provided with a second coupling portion 781. A coupling member 80 such as a rope is connected to the first coupling portion 713 of the latch bar 71 and the second coupling portion 781 of the retainer 78. The latch bar 71 and the retainer 78 are connected through the coupling member 80.

It should be noted that as shown in FIG. 22, the guide 5 includes a coupling portion 505. The guide 5 is connected to the vessel body 2 by a coupling member 79 such as a rope. The coupling member 79 is connected to the coupling portion 505 of the guide 5. Thus, the guide 5 is connected to the vessel body 2 by the coupling member 79 such that the guide 5 is able to be prevented from being detached and dropping.

In the first modification explained above, a less splashy, flat wake is able to be generated by the guide 5 as is similarly done in the first preferred embodiment. Additionally, the guide 5 is attachable to and detachable from the vessel body 2. When the guide 5 is attached to the port side of the vessel body 2, the latch bar 71 is inserted into the eye fastener 74, while the eye fastener 74 is inserted through the first opening 501. Then, the fastener 76 is screwed and tightened into the first hole 711, whereas the retainer 78 is attached to the second hole 712. Accordingly, the guide 5 is able to be easily attached to the vessel body 2.

When the guide 5 is detached from the vessel body 2, the fastener 76 is loosened, and the retainer 78 is pulled off from the second hole 712 while the switch 85 thereof is being pressed. Then, the latch bar 71 is pulled off from the eye fastener 74 such that the guide 5 is able to be easily detached from the vessel body 2.

It should be noted that when the guide 5 is attached to the starboard side of the watercraft 1*a*, the second opening 502 is penetrated by the eye fastener 74, although this configuration is not shown in the drawings. Next, similarly to the configuration that the guide 5 is attached to the port side of the watercraft 1*a*, the latch bar 71 is inserted through the eye fastener 74, and is then fixed by the fastener 76 and the retainer 78. Therefore, the attachment position of the guide 5 is able to be easily switched between the port side and the starboard side of the watercraft 1*a*.

Additionally, the latch bar 71 and the retainer 78 are connected through the coupling member 80. Accordingly, the retainer 78 is able to be prevented from being detached and dropping into the water.

Figure 25:
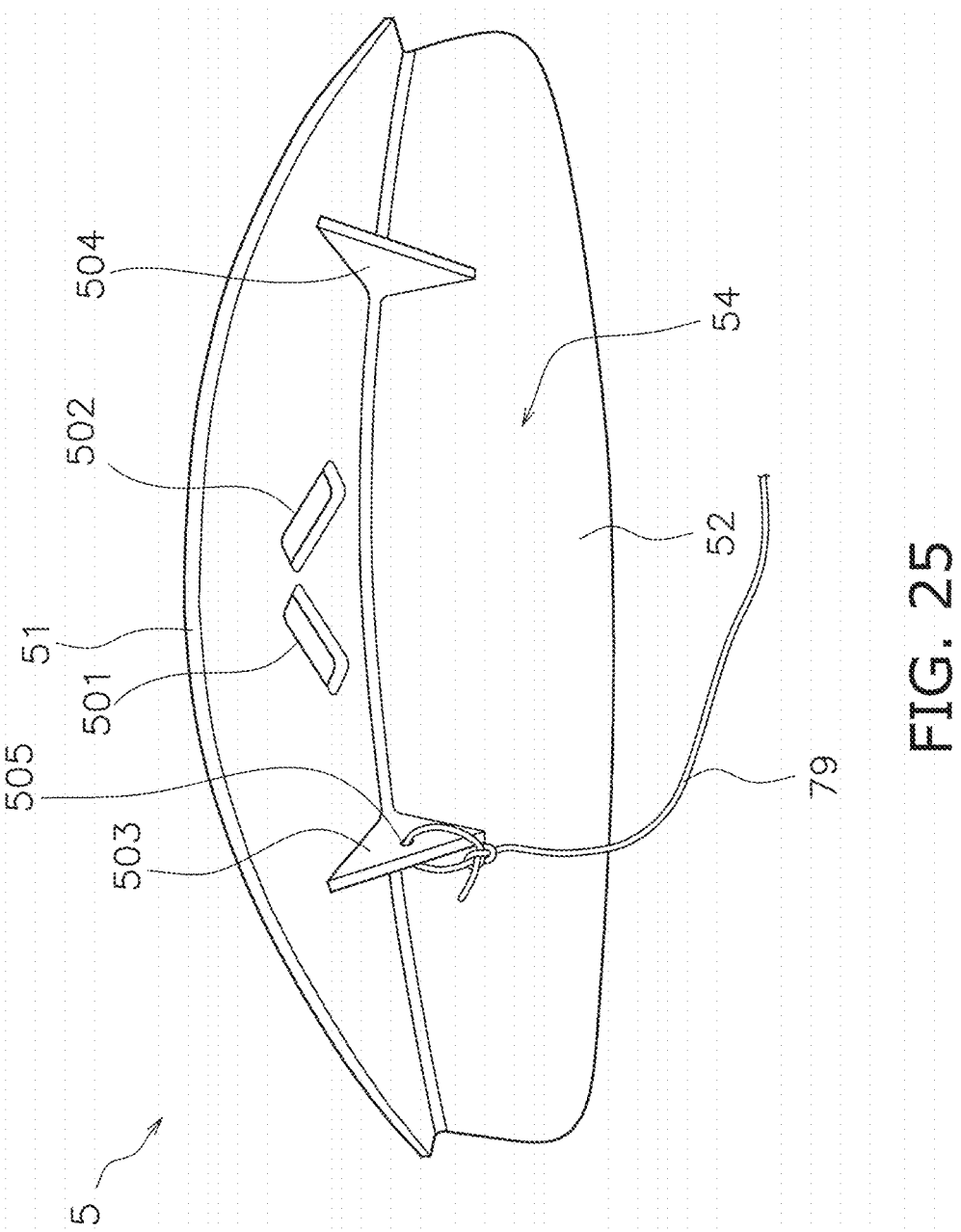
FIG. 25 is a view of a guide according to a second modification of the first preferred embodiment of the present invention.

FIG. 25 is a view of the guide 5 according to a second modification of the first preferred embodiment of the present invention. As shown in FIG. 25, the guide 5 according to the second modification includes ribs 503 and 504. Each of the ribs 503 and 504 is bridged across the corner of the first and second plates 51 and 52. Each of the ribs 503 and 504 is connected to the first and second plates 51 and 52. The ribs 503 and 504 include a first rib 503 and a second rib 504. The first and second openings 501 and 502 are disposed between the first rib 503 and the second rib 504. The latch bar 71 is disposed between the first rib 503 and the second rib 504, while being inserted into the eye fastener 74.

In the guide 5 according to the second modification, the guide 5 is enhanced in strength by the ribs 503 and 504. Additionally, while inserted into the eye fastener 74, the latch bar 71 is prevented from coming off therefrom by the ribs 503 and 504.

It should be noted that as shown in FIG. 25, the guide 5 may include the coupling portion 505. The guide 5 may be connected to the vessel body 2 by the coupling member 79 such as a rope. The coupling member 79 may be connected to the coupling portion 505 of the guide 5. The coupling portion 505 may be provided in the first rib 503 or the second rib 504. Alternatively, the coupling portion 505 may be provided in any other suitable portion of the guide 5.

It should be noted that the coupling member 79 may be connected to the vessel body 2, the guide 5 and the latch bar 71. For example, the coupling member 79 may be connected to the vessel body 2, the coupling portion 505 of the guide 5 and the first coupling portion 713 of the latch bar 71. Accordingly, the guide 5 and the latch bar 71 is able to be prevented from being detached and dropping into the water.

Figure 26:
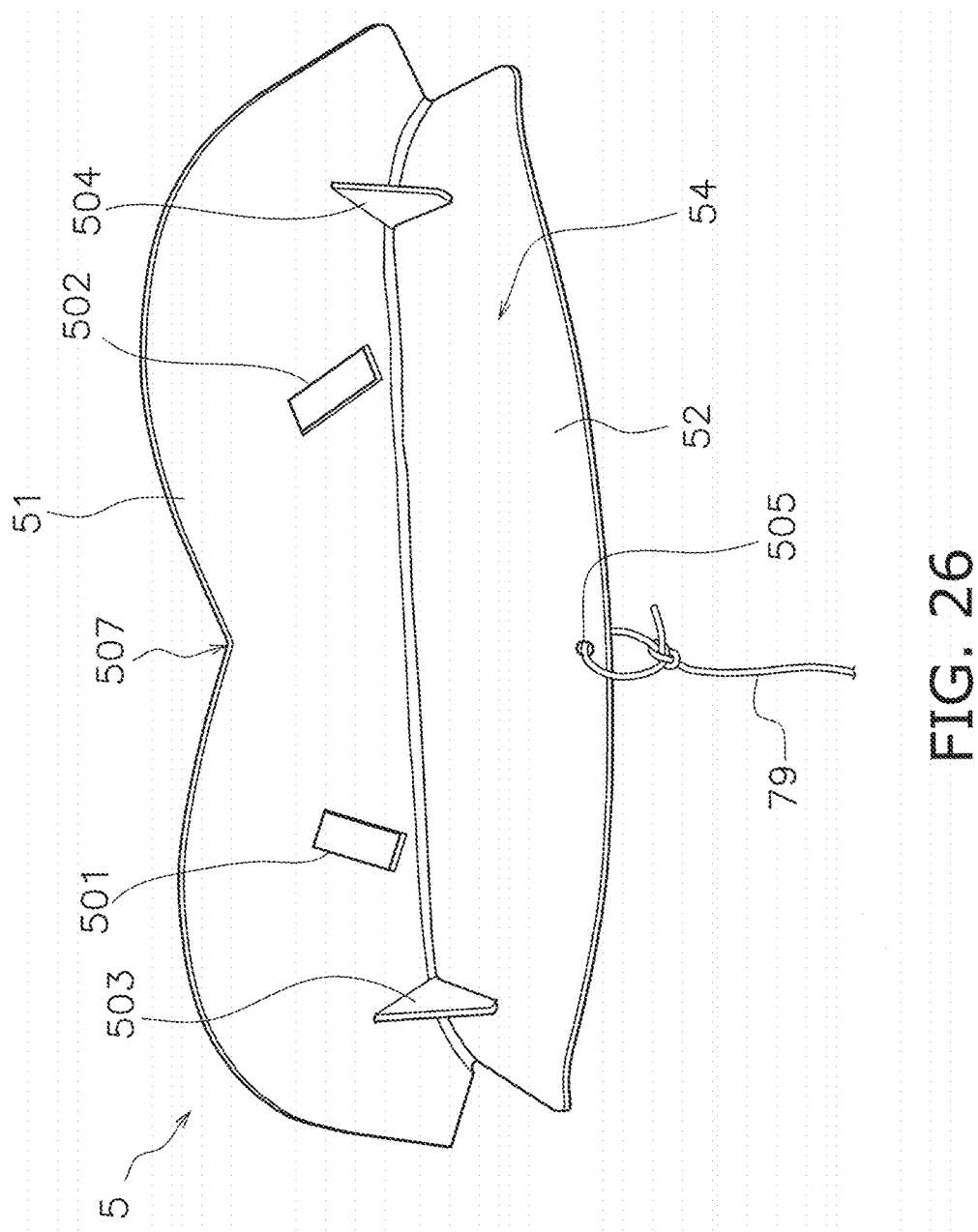
FIG. 26 is a view of a guide according to a third modification of the first preferred embodiment of the present invention.

FIG. 26 is a view of the guide 5 according to a third modification of the first preferred embodiment of the present invention. As shown in FIG. 26, the first plate 51 may include a recessed portion 507. In the guide 5 according to the second modification shown in FIG. 25, the first and second openings 501 and 502 are adjacent to each other. However, as with the guide 5 according to the third modification shown in FIG. 26, the first and second openings 501 and 502 may be remote from each other in the lengthwise direction of the guide 5. The coupling portion 505 may be provided in the second plate 52.

Figure 27:
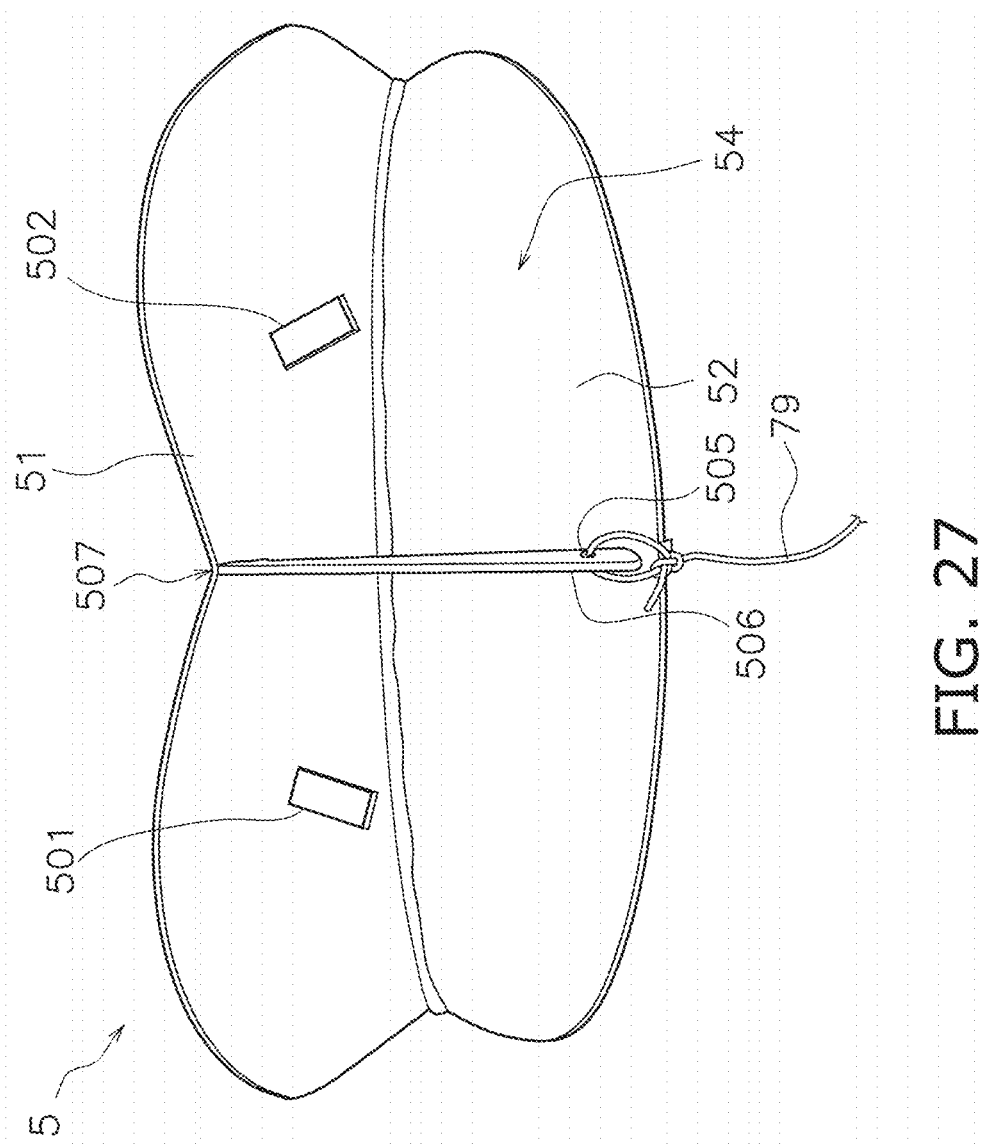
FIG. 27 is a view of a guide according to a fourth modification of the first preferred embodiment of the present invention.

FIG. 27 is a view of the guide 5 according to a fourth modification of the first preferred embodiment of the present invention. The guide 5 according to each of the second and third modifications includes the two ribs 503 and 504. However, as shown in FIG. 27, the guide 5 may include only one rib 506. The rib 506 may be disposed between the first opening 501 and the second opening 502.

Figure 28:
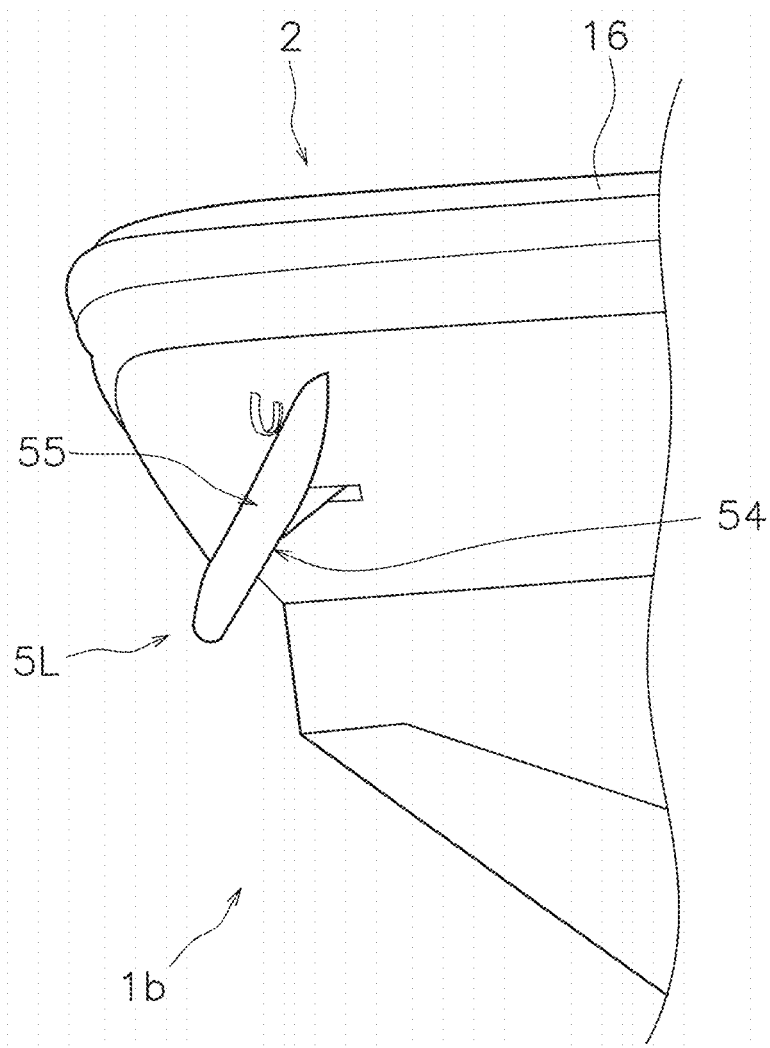
FIG. 28 is a view of a watercraft according to a modification of the second preferred embodiment of the present invention.
Figure 29:
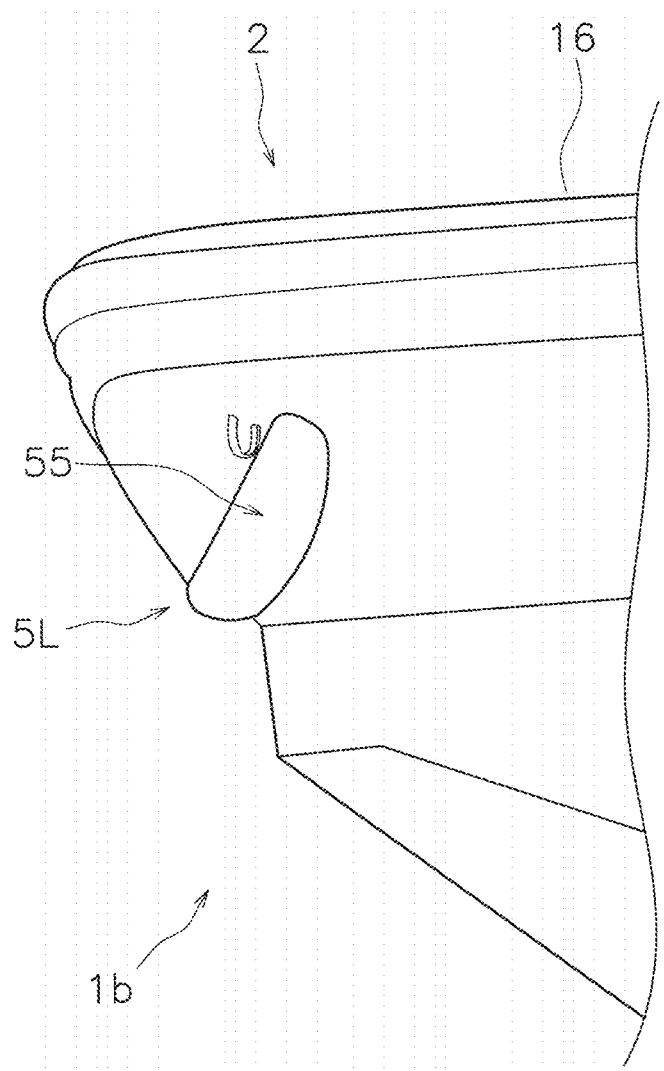
FIG. 29 is a view of a watercraft according to the modification of the second preferred embodiment of the present invention.

The structures of the right and left guides 5R and 5L are not limited to those in the second preferred embodiment, and may be changed. FIGS. 28 and 29 are views of a watercraft 1*b* according to a modification of the second preferred embodiment. In the watercraft 1*b* according to the modification of the second preferred embodiment, each of the right and left guides 5R and 5L is provided to be movable between a deployed position and a retracted position. When set in the deployed position, each of the right and left guides 5R and 5L is disposed to protrude from the bottom surface of the vessel body 2. When set in the retracted position, each of the right and left guides 5R and 5L is disposed along the bottom surface of the vessel body 2. FIG. 28 shows the left guide 5L set in the deployed position. FIG. 29 shows the left guide 5L set in the retracted position.

When set in the deployed position, the left guide 5L is disposed similarly to the guide 5 in the first preferred embodiment. In other words, the first guide surface 54 of the left guide 5L is disposed to extend astern of the vessel body 2 and toward the width directional center of the vessel body 2 from a position located sideward of the first and second jet spouts 29L and 29R. Additionally, at least a portion of the first guide surface 54 is disposed above the first and second water spouts 29L and 29R. Accordingly, a less splashy, flat wake is able to be generated.

Figure 30:
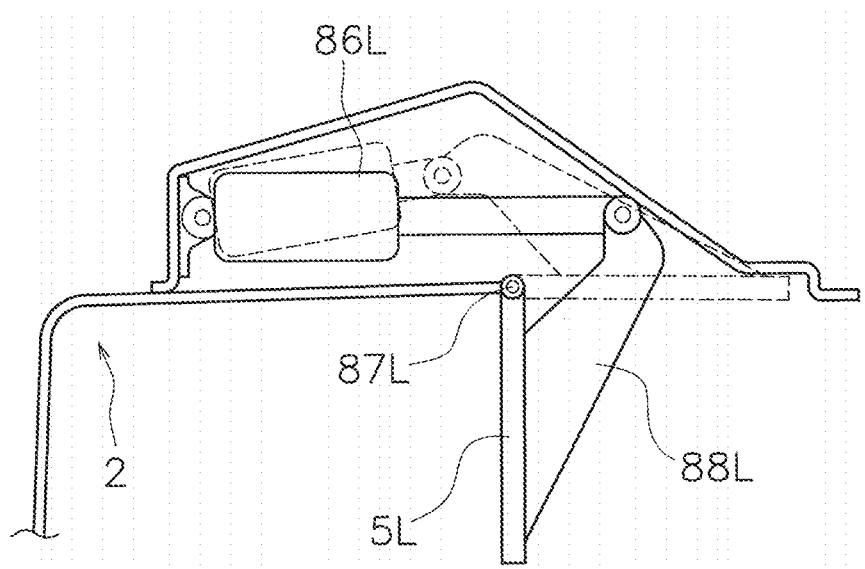
FIG. 30 is a view of a left actuator.

The watercraft 1*b* according to the modification of the second preferred embodiment includes a left actuator 86L shown in FIG. 30. As shown in FIG. 30, the left guide 5L includes a rotational axis 87L, and is moved to the retracted position and the deployed position by rotating about the rotational axis 87L. It should be noted that in FIG. 30, a solid line indicates the left guide 5L and the left actuator 86L when the left guide 5L is set in the deployed position. A broken line indicates the left guide 5L and the left actuator 86L when the left guide is set in the retracted position. The left actuator 86L is connected to the left guide 5L, and moves the left guide 5L to the retracted position and the deployed position.

An arm portion 88L is connected to the left guide 5L. The left actuator 86L is either a hydraulic cylinder or an electric cylinder. The left actuator 86L is rotatably connected to the arm portion 88L. The left actuator 86L is rotatably connected to the vessel body 2. When the left actuator 86L is extended, the left guide 5L is moved from the retracted position to the deployed position. When the left actuator 86L is contracted, the left guide 5L is moved from the deployed position to the retracted position. However, the left actuator 86L is not limited to the cylinder, and alternatively, may be another type of mechanism including, for instance, a motor and a gear.

Figure 31:
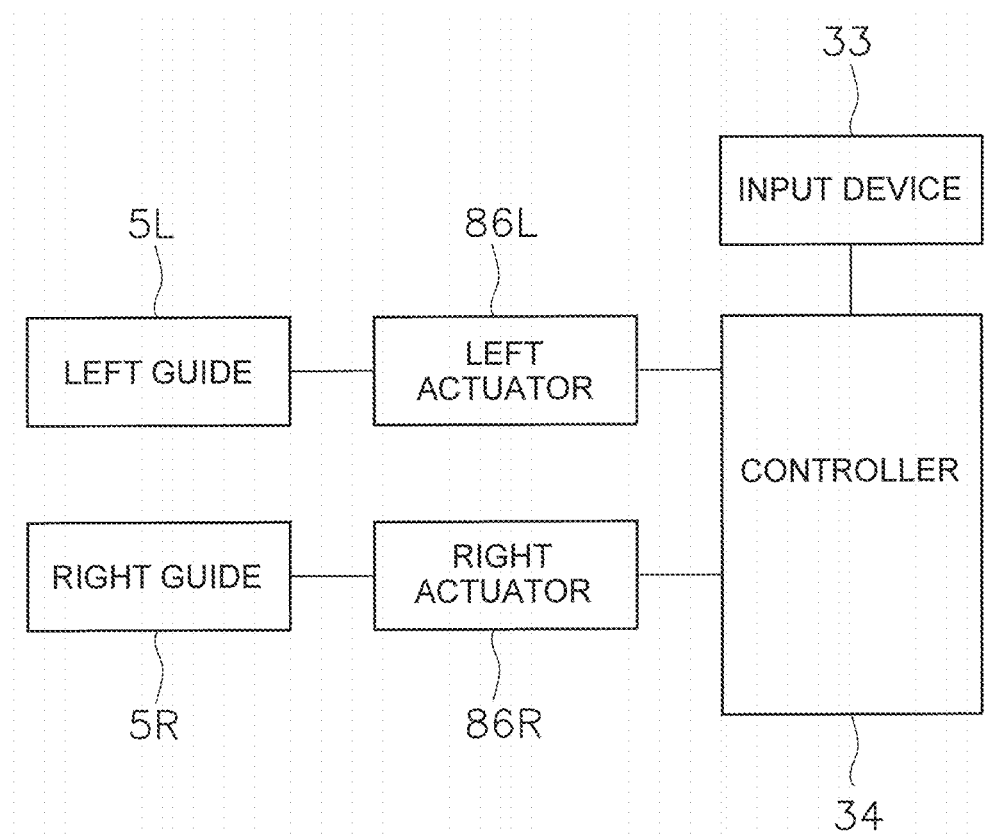
FIG. 31 is a diagram of a control system of the watercraft according to the modification of the second preferred embodiment of the present invention.

FIG. 31 is a diagram of a control system of the watercraft 1b according to the modification of the second preferred embodiment. As shown in FIG. 31, the watercraft 1b according to the modification of the second preferred embodiment includes the right guide 5R and a right actuator 86R. The right guide 5R is bilaterally symmetrical to the left guide 5L, and therefore, has a similar configuration to the left guide 5L. The right actuator 86R is bilaterally symmetrical to the left actuator 86L, and therefore, has a similar configuration to the left actuator 86L.

The right and left actuators 86R and 86L are controlled by the controller 34. The controller 34 is capable of selecting either of the right and left guides 5R and 5L by controlling the right and left actuators 86R and 86L in response to the operation of the input device 33 by the user. For example, when the left guide 5L is selected by the input device 33, the controller 34 sets the right guide 5R in the retracted position and sets the left guide 5L in the deployed position by controlling the right and left actuators 86R and 86L. Accordingly, a flat wake is able to be generated by the left guide 5L.

When the right guide 5R is selected by the input device 33, the controller 34 sets the left guide 5L in the retracted position and sets the right guide 5R in the deployed position by controlling the right and left actuators 86R and 86L. Accordingly, a flat wake is able to be generated by the right guide 5R. Alternatively, when non-use of the right and left guides 5R and 5L is selected by the input device 33, the controller 34 sets the left guide 5L in the retracted position, and simultaneously, sets the right guide 5R in the retracted position by controlling the right and left actuators 86R and 86L.

Similar to the watercraft 1b according to the modification of the second preferred embodiment explained above, a region of a flat wake preferable for wakesurfing is able to be reliably widened by the right guide 5R or the left guide 5L.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft comprising:
a vessel body;
a marine propulsion device attached to the vessel body and including a water stream generator that propels the vessel body; and
a guide provided on the vessel body; wherein
the guide extends astern of the vessel body and toward a center of the vessel body in a width direction of the vessel body from a position located sideward of the water stream generator; and
the guide inwardly directs water flowing on a first side of the vessel body such that confluent timing of the water flowing on the first side of the vessel body and water flowing on a second side of the vessel body is caused to occur earlier than when the guide is not provided on the vessel body.

2. The watercraft according to claim 1, wherein the guide directs the water flowing on the first side of the vessel body to a position located behind and above the water stream generator.

3. The watercraft according to claim 2, wherein a lower end of the guide is disposed above a lower end of the water stream generator.

4. The watercraft according to claim 2, wherein an upper end of the guide is disposed above an upper end of the water stream generator.

5. The watercraft according to claim 2, wherein the guide has a curved surface shape.

6. The watercraft according to claim 1, wherein the guide includes a connector detachably connected to the vessel body.

7. The watercraft according to claim 6, wherein the guide is attachable to the vessel body either rightward or leftward of the water stream generator.

8. The watercraft according to claim 1, wherein the guide is located below a surface of water when a vessel velocity is less than or equal to a predetermined velocity, and the guide is located above the surface of water when the vessel velocity is greater than the predetermined velocity.

9. The watercraft according to claim 8, wherein the predetermined velocity is a velocity at which the watercraft planes.

10. The watercraft according to claim 1, wherein the guide further includes a water diverter actuatable to change a direction in which the water is directed.

11. The watercraft according to claim 1, wherein at least a portion of the guide is integrated with the vessel body.

12. The watercraft according to claim 1, wherein
the guide further includes an inlet and an outlet for the water directed by the guide; and
the outlet is narrower than the inlet.

13. The watercraft according to claim 1, wherein
the vessel body includes a lateral surface located in front of a front end of the guide; and
the front end of the guide is flush or substantially flush with the lateral surface of the vessel body.

14. The watercraft according to claim 1, wherein
the vessel body includes a lateral surface located in front of a front end of the guide; and
the guide is located inside the lateral surface of the vessel body in the width direction of the vessel body.

15. A watercraft comprising:
a vessel body;
a marine propulsion device attached to the vessel body and including a water stream generator that propels the vessel body;
a left guide disposed leftward of the water stream generator; and a right guide disposed rightward of the water stream generator; wherein the left guide extends astern of the vessel body and toward a center of the vessel body in a width direction of the vessel body from a position located leftward of the water stream generator;

the right guide extends astern of the vessel body and toward the center of the vessel body in the width direction of the vessel body from a position located rightward of the water stream generator;

the left guide inwardly directs water flowing on a left side of the vessel body such that confluent timing of the water flowing on the left side of the vessel body and water flowing on a right side of the vessel body is caused to occur earlier when the left guide is used than when the left guide is not used; and the right guide inwardly directs the water flowing on the right side of the vessel body such that the confluent timing of the water flowing on the right side of the vessel body and the water flowing on the left side of the vessel body is caused to occur earlier when the right guide is used than when the right guide is not used.

16. The watercraft according to claim 15, wherein the left guide includes a left inlet that the water guided by the left guide enters; and the right guide includes a right inlet that the water guided by the right guide enters; wherein the watercraft further comprises:

a left actuator to open/close the left inlet; and a right actuator to open/close the right inlet.

17. A guide attached to a vessel body including a water stream generator that propels the vessel body, the guide comprising:

a connector detachably attached to the vessel body;

a first guide surface extending astern of the vessel body and toward a center of the vessel body in a width direction of the vessel body from a position located sideward of the water stream generator in a condition that the guide is attached to the vessel body; and a second guide surface disposed outside the first guide surface; wherein the first guide surface directs water flowing on a first side of the vessel body to a position located behind and above the water stream generator when the guide is attached to the vessel body; and the second guide surface inwardly directs the water flowing on the first side of the vessel body such that confluent timing of the water flowing on the first side of the vessel body and water flowing on a second side of the vessel body is caused to occur earlier when the guide is attached to the vessel body than when the guide is not attached to the vessel body.

18. The guide according to claim 17, wherein the guide has a bilaterally symmetrical shape.

19. A watercraft comprising:

a vessel body;

a marine propulsion device attached to the vessel body and including a water stream generator that propels the vessel body; and a guide provided on the vessel body; wherein the guide inwardly directs water flowing on a first side of the vessel body such that confluent timing of the water flowing on the first side of the vessel body and water flowing on a second side of the vessel body is caused to occur earlier than when the guide is not provided on the vessel body; and at least a portion of the guide is disposed above the water stream generator.

20. The watercraft according to claim 19, wherein the guide is movable to a retracted position and a deployed position, the guide being disposed along a bottom surface of the vessel body when in the retracted position, the guide being disposed to protrude from the bottom surface of the vessel body when in the deployed position; and the guide in the deployed position extends astern of the vessel body and toward a center of the vessel body in a width direction of the vessel body from a position located sideward of the water stream generator, with at least a portion thereof being disposed above the water stream generator.

21. The watercraft according to claim 20, wherein the guide includes a rotational axis and is movable to the retracted position and the deployed position by rotating about the rotational axis.

22. The watercraft according to claim 20, further comprising an actuator connected to guide to move the guide to the retracted position and the deployed position.

23. A watercraft comprising:

a vessel body;

a marine propulsion device attached to the vessel body including a water stream generator that propels the vessel body; and a guide provided on the vessel body; wherein the guide directs water flowing along a lateral surface of the vessel body toward a water stream generated by the water stream generator so as to eliminate a splash generated by the water stream and generate a wake for wakesurfing.

* * * * *